US012752738B2

(12) United States Patent
Speers et al.

(10) Patent No.: US 12,752,738 B2
(45) Date of Patent: Oct. 6, 2026

(54) VEHICLE ANTI-THEFT SYSTEM

(71) Applicant: Light Wave Technology Inc., St-Laurent (CA)

(72) Inventors: James Speers, St. Albert (CA); Jack Wisnia, Dollard-des Ormeaux (CA); Robert Nelson, Westmount (CA)

( * ) Notice: Subject to any disclaimer, the term of this patent is extended or adjusted under 35 U.S.C. 154(b) by 0 days.

(21) Appl. No.: 19/209,413

(22) Filed: May 15, 2025

(65) Prior Publication Data

US 2025/0304006 A1 Oct. 2, 2025

Related U.S. Application Data

(62) Division of application No. 18/990,632, filed on Dec. 20, 2024, now Pat. No. 12,330,590.

(60) Provisional application No. 63/727,056, filed on Dec. 2, 2024, provisional application No. 63/571,047, filed on Mar. 28, 2024.

(51) Int. Cl.
*B60R 25/24* (2013.01)
*B60R 25/04* (2013.01)
*G07C 5/00* (2006.01)

(52) U.S. Cl.
CPC ............ *B60R 25/241* (2013.01); *B60R 25/04* (2013.01); *G07C 5/00* (2013.01)

(58) Field of Classification Search
None
See application file for complete search history.

(56) References Cited

U.S. PATENT DOCUMENTS

| | | | | |
|---|---|---|---|---|
| 5,307,048 | A | 4/1994 | Sonders | |
| 6,788,189 | B2 | 9/2004 | Kikkawa et al. | |
| 7,061,137 | B2 | 6/2006 | Flick | |
| 8,918,251 | B2 | 12/2014 | Tarnutzer et al. | |
| 10,179,568 | B2 | 1/2019 | Hariri et al. | |
| 10,864,861 | B1 * | 12/2020 | Dodman | B60R 13/02 |
| 10,870,411 | B1 | 12/2020 | Schafer et al. | |
| 11,046,287 | B1 * | 6/2021 | Schafer | B60R 25/007 |
| 11,214,233 | B2 | 1/2022 | Sakurada et al. | |
| 11,267,439 | B2 | 3/2022 | Elangovan et al. | |
| 11,338,675 | B2 | 5/2022 | De Vries et al. | |

(Continued)

FOREIGN PATENT DOCUMENTS

| | | |
|---|---|---|
| AU | 2016216531 B2 | 4/2021 |
| CN | 116215443 A | 6/2023 |

(Continued)

OTHER PUBLICATIONS

Cho, Kyong-Tak, and Kang G. Shin. "Error handling of in-vehicle networks makes them vulnerable." Proceedings of the 2016 ACM SIGSAC Conference on Computer and Communications Security. 2016. https://dl.acm.org/doi/pdf/10.1145/2976749.2978302.

(Continued)

*Primary Examiner* — Carlos Garcia
(74) *Attorney, Agent, or Firm* — Anglehart et al.

(57) ABSTRACT

A vehicle is immobilized when a personal identifying device of an authorized vehicle user in proximity to the vehicle is not authenticated and an intended use of the vehicle is detected. Various mechanisms can be used to immobilize the vehicle, such as the use to transmitting a null message to the passive keyless entry and start system in at least one time slot based on a timing established by a detected challenge message.

20 Claims, 10 Drawing Sheets

(56) References Cited

U.S. PATENT DOCUMENTS

| | | | | |
|---|---|---|---|---|
| 11,472,372 | B2 * | 10/2022 | Kim | E02F 9/26 |
| 11,524,656 | B2 | 12/2022 | Yorke et al. | |
| 11,897,420 | B2 | 2/2024 | Ette | |
| 2010/0186044 | A1 * | 7/2010 | Yang | H04N 21/6131 725/50 |
| 2013/0317693 | A1 | 11/2013 | Jefferies et al. | |
| 2016/0196087 | A1 * | 7/2016 | Wang | G06F 12/0813 711/154 |
| 2016/0295414 | A1 * | 10/2016 | Giraud | H04W 4/44 |
| 2018/0015905 | A1 | 1/2018 | Yorke et al. | |
| 2018/0367554 | A1 | 12/2018 | Allouche et al. | |
| 2019/0138018 | A1 | 5/2019 | Cave | |
| 2020/0238952 | A1 | 7/2020 | Lindsay et al. | |
| 2020/0353894 | A1 | 11/2020 | Obaidi | |
| 2021/0058183 | A1 | 2/2021 | Lee et al. | |
| 2021/0058393 | A1 * | 2/2021 | Alpert | H04L 63/0876 |
| 2021/0229633 | A1 | 7/2021 | DeLong et al. | |
| 2022/0172530 | A1 | 6/2022 | Amadi et al. | |
| 2023/0219526 | A1 | 7/2023 | Wisnia et al. | |

FOREIGN PATENT DOCUMENTS

| | | | |
|---|---|---|---|
| CN | 111212413 | B | 7/2023 |
| CN | 118631704 | A | 9/2024 |
| DE | 102006060522 | A1 | 6/2008 |
| IN | 202341020551 | A | 4/2023 |
| JP | 2003301639 | A | 10/2003 |
| JP | 2015227157 | A | 12/2015 |
| KR | 20200052699 | A | 5/2020 |
| RU | 2714557 | C2 | 2/2020 |
| TW | I350258 | B | 10/2011 |
| WO | 2023/202791 | A1 | 10/2023 |

OTHER PUBLICATIONS

Extended European search report dated Dec. 11, 2025 in the Corresponding European application No. 1 25163699.9.

Partial European search report dated Aug. 27, 2025 in the Corresponding European application No. 25163699.9.

* cited by examiner

VEHICLE ANTI-THEFT SYSTEM

The present application is a divisional of U.S. patent application Ser. No. 18/990,632 filed on Dec. 20, 2024, that claimed priority from U.S. provisional patent application No. 63/727,056 filed on Dec. 2, 2024 and U.S. provisional patent application No. 63/571,047 filed on Mar. 28, 2024, the contents of which are incorporated herein by reference.

TECHNICAL FIELD

The present application relates to systems, devices and methods for controlling vehicles equipped with passive keyless entry and start (PKES) systems.

BACKGROUND

Cars and trucks having a passive keyless entry are commonly stolen by defeating the existing security provided by PKES systems.

The most common form of attack (the first form of attack) involves repeating the wireless transmissions between the vehicle and the owner's key fob. This requires the thieves to have an electronic unit close to the key fob (either by having one thief follow the owner or move close to where the key fob has been placed, such as next to the entrance to a home) and another unit with a thief who will take control of the vehicle and drive away. This is known as a relay attack.

A second common form of attack involves gaining access to the electronic data bus of the vehicle and using bus commands to issue a command to allow the vehicle to unlock and start the vehicle.

A third common form of attack involves gaining access to the electronic data bus of the vehicle and using bus commands to program a new key fob.

Vehicle anti-theft systems, such as those known as immobilizers, are commonly used in vehicles to prevent unauthorized use of a vehicle even if the vehicle's normal anti-theft measures are defeated by a thief. Immobilizers typically involve an additional mechanism for preventing the vehicle from being driven, such as an ignition kill switch, and an additional mechanism for the vehicle owner to disarm the immobilizer. While immobilizers add an additional level of deterrent that a thief must deal with, when the location of the immobilizer's kill switch is known to thieves, or it becomes known how to disarm the immobilizer, the level of theft deterrence is reduced.

It would be desirable to have a robust and reliable anti-theft system or device that could prevent and protect against most theft attempts and thief attacks.

There is also a need to develop a robust and reliable non-invasive anti-theft system or device, which could be added to or installed in any vehicle.

SUMMARY

One broad aspect of the present disclosure is a robust and reliable vehicle anti-theft system or device with double authentication for vehicles having a passive keyless entry, which can be added to or installed in any vehicle (e.g., as a non-invasive aftermarket device/system).

Another broad aspect of the present disclosure is an anti-theft module preventing unauthorized passive key access to vehicle having a passive keyless entry and for use with a vehicle anti-theft system of said vehicle having a passive keyless entry, the anti-theft module comprising: (i) communication input or input/output connectable to said vehicle anti-theft system and for receiving control signals from said vehicle anti-theft system, wherein said controls signal comprises a disabling command; (ii) a first transceiver or a transmitter responsive to said received control signals and for use within at least one of a radio frequency range of: (a) about 125 kHz to about 132 kHz; (b) about 3 MHz to about 30 MHZ; and (c) about 300 KHz to about 3 GHZ; and (iii) said anti-theft module being configured to send disabling radio signals in said at least one radio frequency range to a passive key transceiver of said vehicle in response to said disabling command, wherein said disabling radio signals comprises at least one of: (1) a jamming radio signal for jamming radio functions of said passive key transceiver, (2) a jamming radio signal for jamming radio functions of a passive key of said vehicle, and (3) a disabling code known by a PKES system of said vehicle for preventing said PKES system granting said passive keyless entry.

In some embodiments of the anti-theft module, wherein said disabling command comprises said disabling code and wherein said disabling radio signals comprises said disabling code.

In some embodiments of the anti-theft module, the disabling code is null code for aborting an ongoing process of said PKES system.

In some embodiments, the anti-theft module comprises said first transceiver and said communication input/output, wherein said anti-theft module outputs, via said communication input/output, data indicating activation of said passive key transceiver when said first transceiver detects a radio signal from said passive key transceiver.

In some embodiments, the anti-theft module receives power from said anti-theft device via said input.

In some embodiments of the anti-theft module, the transceiver or transmitter is an NFC or an RFID transceiver, thereby allowing use of said anti-theft module by said anti-theft device to identify an alternative personal identifying device, and wherein the anti-theft module comprises said communication input/output that further sends information received from said alternative personal identifying device to said vehicle anti-theft system.

In some embodiments, the alternative personal identifying device is a passive identification device.

A further broad aspect of the present disclosure is an immobilizer is inactive to prevent use of a vehicle until a presence of a potential user of the vehicle is detected at the vehicle. This can be called an intended use detection. Only when the presence is detected, the immobilizer will not prevent the vehicle from being operated if the user is authenticated. This can prevent the immobilizer from preventing some types of remote starting of the vehicle, unless remote starting is done at the same time as the detection of the potential user at the vehicle. Detecting of the potential user can be done in a variety of ways, such as a dashcam (imaging the exterior and/or the interior of the vehicle), radar-based proximity sensor, and the PKES' low frequency challenge message transmission resulting from an attempt to open a vehicle door or to start the vehicle. In some embodiments, the immobilizer can thwart the second common form of attack described above by sending jamming messages on the vehicle bus in response to the detection of the presence of a potential user of the vehicle.

In some embodiments, when the presence of a potential user of the vehicle is detected at the vehicle, and a user authentication device is not detected within close range of the vehicle, an alert message is sent to the user authentication device. This can be called an intended use detection. Detecting the potential user can be done in a variety of ways, such as a dashcam (imaging the exterior and/or the interior of the vehicle), radar-based proximity sensor, and the PKES' LF challenge message transmission resulting from an attempt to open a vehicle door or to start the vehicle.

In some embodiments, the relay attack may be deterred using an all-wireless anti-theft device that can be hidden at almost any location within a vehicle making it quite difficult to locate and remove. The theft deterrence device may include an authenticator for authenticating the vehicle owner and it may detect the PKES' low frequency challenge message transmission destined for the owner's key fob as a trigger. Once triggered, if the owner authentication is absent, the deterrence device may send an alert message to the owner and/or a wireless PKES signal to defeat the relay attack, for example by transmitting a lock and arm signal using an OEM key fob or fob emulator.

In some embodiments, a second common form of attack described above is thwarted by sending wireless PKES signal to defeat the relay attack, for example by transmitting a lock and arm signal using an OEM key fob or fob emulator. In some models of PKES vehicles, a bus command to allow the vehicle to be started is removed or reset by the lock and arm command.

In some embodiments, the second common form of attack described above is thwarted by sending jamming messages on the vehicle bus in response to.

In some embodiments, the third common form of attack described above is thwarted by sending wireless PKES signal to defeat the relay attack, for example by transmitting a lock and arm signal using an OEM key fob or fob emulator. In some models of PKES vehicles, a bus command to program a new key fob is removed or reset by the lock and arm command.

In some embodiments, the third common form of attack described above is thwarted by disconnecting the antenna used to program a new key fob or by jamming the communication between the antenna used to program a new key fob and the new key fob.

Yet another broad aspect of the present disclosure includes a theft-prevention device for a vehicle having a passive keyless entry and start (PKES) system for authenticating a driver possessing a key fob to use the vehicle, the device comprising: (i) an intended use detector having an output indicative of an intended use of the vehicle, the detector comprising at least one of: (a) a low-frequency (LF) detector for detecting an LF signal sent by the PKES system to an OEM key fob indicating that a door contact or a start button has been activated; (b) a proximity sensor for detecting a presence of a person next to or inside the vehicle; and (c) a camera for detecting a presence of a person next to or inside the vehicle; (ii) an authenticator for attempting authentication of a personal identifying device of an authorized vehicle user in proximity to the vehicle by exchanging authentication information with the personal identifying device; (iii) a vehicle start disabler responsive to the detector output and to the authenticator, the disabler comprising at least one of: (1) a jamming transmitter for disabling normal interaction between the key fob and the PKES system; (2) at least one switch for controllably disconnecting one or more antennae from the PKES system for interrupting transmission between the PKES system and the key fob; (3) a transmitter for sending a "lock and arm" command to the PKES system; (4) a switch for controllably interrupting detection of a start button and/or a brake pedal; and (5) a bus message transmitter for sending messages on the bus to impair use of the bus, (iv) whereby the vehicle is prevented from being started when the personal identifying device is not proximate the vehicle.

In some embodiments of the theft-prevention device, the vehicle start disabler comprises the at least one switch for controllably disconnecting one or more antennae from the PKES system for interrupting transmission between the PKES system and the key fob.

In some embodiments of the theft-prevention device, the one or more antennae include a passive RFID transponder antenna.

In some embodiments of the theft-prevention device, the one or more antennae include an antenna associated with detecting the key fob outside a door of the vehicle.

In some embodiments of the theft-prevention device, the one or more antennae include an antenna associated with detecting the key fob inside the vehicle.

In some embodiments of the theft-prevention device, the vehicle start disabler comprises the transmitter for sending a "lock and arm" command to the PKES system.

In some embodiments of the theft-prevention device, the transmitter for sending a "lock and arm" command to the PKES system is a wireless transmitter for providing a wireless transmission corresponding to a transmission of the key fob when a lock or a "lock and arm button" is pushed.

In some embodiments of the theft-prevention device, the transmitter comprises a key fob emulation chip programmable to be recognized by the PKES system of the vehicle.

Some embodiments of the theft-prevention device further comprise a controller connected to the authenticator, the controller being operative to cause the key fob emulation chip to wirelessly interact with the PKES system to allow the authorized vehicle user to use the vehicle.

In some embodiments of the theft-prevention device, the transmitter for sending a "lock and arm" command to the PKES system is a vehicle bus interface for sending the "lock and arm" command to the PKES system over the vehicle bus.

In some embodiments of the theft-prevention device, the intended use detector comprises the low-frequency (LF) wireless detector.

In some embodiments of the theft-prevention device, the authenticator comprises a Bluetooth® transceiver.

In some embodiments of the theft-prevention device, the authenticator comprises a processor and a memory, the memory storing instructions that when executed by the processor cause the processor to communicate with the personal identifying (ID) device to exchange messages to attempt to authenticate the authorized vehicle user.

In some embodiments of the theft-prevention device, the instructions further cause the processor to: (a) receive and store location data from the personal identifying device of an authorized vehicle user; (b) determine if the location data indicates a location discrepancy between the last known location data of the personal identifying device and the current location data; (c) when no location discrepancy is determined, allowing authentication to proceed; (d) when location discrepancy is determined, either preventing authentication from proceeding, or sending a request to the personal identifying device to request further user input at the personal identifying device to confirm that the vehicle may be used and on receipt of the input, allowing authentication to proceed.

Some embodiments of the theft-prevention device further comprise a network interface responsive to the detector output and to the authenticator, the network interface configured to send a warning message when the detector output indicates intended use of the vehicle and the authenticator indicates that the authentication of the personal identifying device failed.

In some embodiments of the theft-prevention device, the network interface is configured to send the warning message to the personal identifying device of an authorized vehicle user.

In some embodiments of the theft-prevention device, the low-frequency (LF) detector is a wireless sensor for detecting a wireless LF signal sent by the PKES system to an OEM key fob.

In some embodiments of the theft-prevention device, the low-frequency (LF) detector is a wired sensor connected to a bus associated with the PKES system for detecting a command sent by the PKES system to an LF signal transmitter.

Another broad aspect of the present disclosure is a computer program product for providing a vehicle theft prevention personal identifying device for an authorized vehicle user, the product comprising non-transient memory storing processor instructions that when executed by a processor associated with a user input device, a data transceiver and a locator cause the processor to: (i) establish a connection with an authenticator of the above theft-prevention device; (ii) one of: (a) transmit location data from the locator to the authenticator; (b) respond to authentication messages from the authenticator; (c) respond to a request from the authenticator for user input by transmitting user input from the user input device to the authenticator; and (d) record a location from the locator when the connection with the authenticator was last established; (iii) if a current location from the locator indicates that the location has not changed since the last connection, exchange authentication messages with the authenticator without requiring user input; (iv) if a current location from the locator indicates that the location has changed since the last connection, require user input through the user input device before exchanging authentication messages with the authenticator.

In some embodiments of the computer program product, the personal identifying device is a smartphone and the instructions are part of an app for the smartphone, the instructions further causing the processor to: (v) communicate with the authenticator in a background mode of the app; (vi) provide a notification message in response to the request from the authenticator or when the current location from the locator indicates that the location has changed since the last connection; (vii) obtain the user input through a foreground mode of the app.

In some embodiments of the computer program product, the data transceiver includes a Bluetooth® transceiver and the locator includes a GPS receiver.

BRIEF DESCRIPTION OF THE DRAWINGS

The invention will be better understood by way of the following detailed description of the embodiments of the invention with reference to the appended drawings, in which.

DETAILED DESCRIPTION

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

From the foregoing it will be appreciated that, although specific embodiments have been described herein for purposes of illustration, various modifications may be made without deviating from the spirit and scope of the teachings. Accordingly, the claims are not limited by the disclosed embodiments.

The following is a detailed description of embodiments of the disclosure depicted in the accompanying drawings. The embodiments are in such detail as to clearly communicate the disclosure without limiting the anticipated variations of the possible embodiments and may encompass all modifications, equivalents, combinations and alternatives falling within the spirit and scope of the present disclosure. It will be appreciated by those skilled in the art that well-known methods, procedures, physical processes and components may not have been described in detail in the following so as not to obscure the specific details of the disclosed invention.

Figure 1:
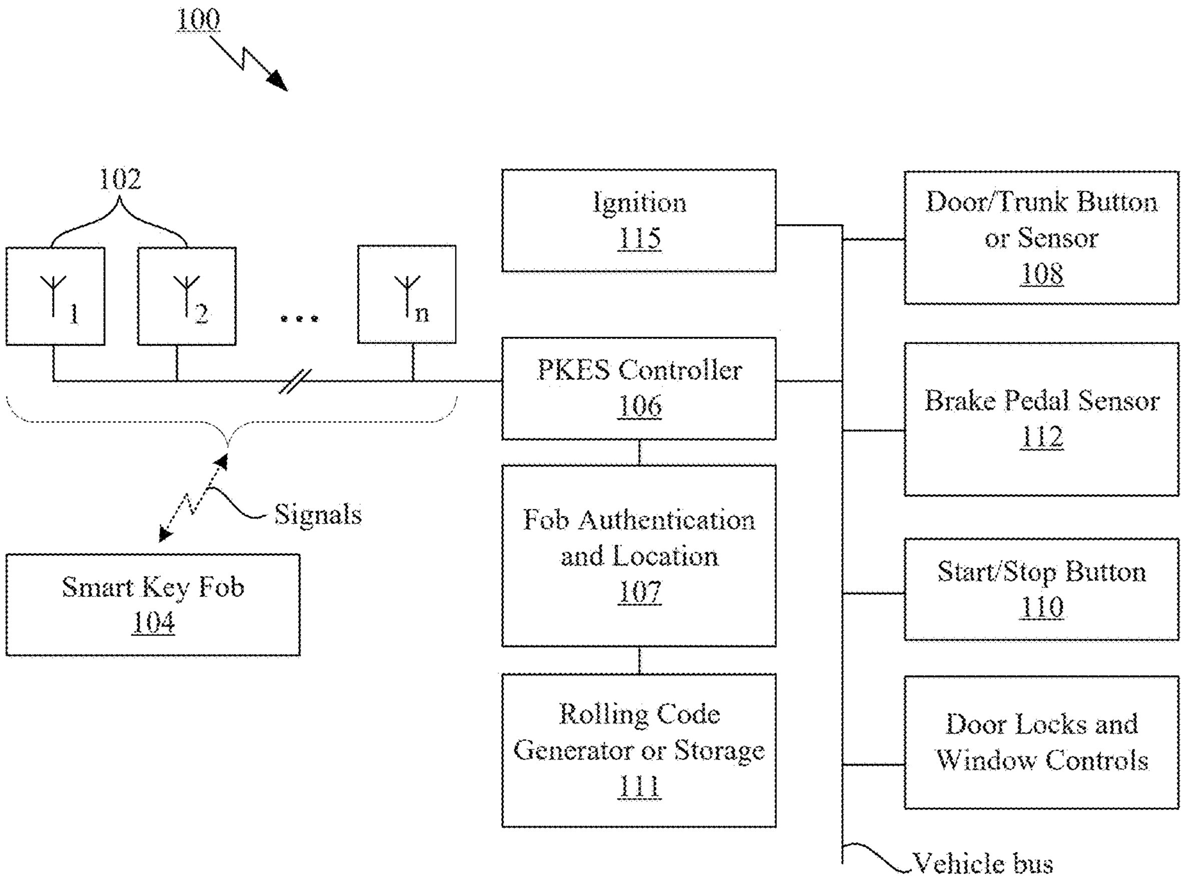
Fig. 1 Prior art
FIG. 1 is a schematic block diagram of a prior art passive keyless entry and start (PKES) system.

FIG. 1 schematically illustrates a conventional passive keyless entry and start (PKES) system 100 also referred to as an OEM security system 100. Antennas 102 may be located on the outside of the door panels as well as inside the vehicle. In some systems, the PKES controller 106 in the vehicle sends a wireless challenge message to the smart key 104 over the antennas and waits for the smart key to respond in a way that allows the PKES system 100 to identify the location of the smart key, namely inside or outside of the vehicle. Some systems use a directional antenna in the smart key fob to detect a position of the key with respect to the antennas, with the direction information received at the smart key 104 being sent back to the PKES in its response.

The PKES system 100 can authenticate the smart key fob using a security protocol. The smart key fob 104 can comprise an unlock button 108 that can be used to unlock the doors or trunk.

The antennas 102 can be any state-of-the-art radio frequency antennas (receiver or transmitter or transceiver), such as low-frequency (LF), high-frequency (HF), radio frequency identification (RFID) and/or near field communication (NFC) antennas.

The PKES controller 106 is typically a proprietary system specific to the vehicle manufacturer and is known to vary over time and with the vehicle model. Smart key location and authentication module 107 can comprise software in the vehicle's computer controller. When the button 110 and the brake pedal sensor 112 are activated, the PKES controller 106 normally transmits a signal to the smart key fob 104 using an antenna 102 for inside the vehicle to authenticate the fob 104 and signal the ignition module 115 to start the engine of the vehicle.

The methods, systems and apparatuses proposed herein can be used to provide additional security, e.g., double authentication, to vehicles by preventing use of the vehicle even in the case that OEM authentication is satisfied when the additional security authentication is not satisfied. In some embodiments, the additional security is provided by using a location/proximity detection of a user (i.e., a personal identifying device the user carries) and authentication step to ensure that the person interacting with the vehicle is an authorized user and by actively preventing any access to or control of the vehicle (e.g., the PKES system) when it is determined that the person interacting with the vehicle is not an authorized user according to the additional security authentication.

In some embodiments, detection of an intended use of the vehicle is a trigger for immobilizing the vehicle. Intended use of a vehicle can be detected by presence or physical contact. For example, a physical interaction with the vehicle such as any direct contact between a person and the vehicle (e.g., touching any part of the vehicle, such as the windows, door handles or locks, etc.) or various indirect contact (e.g., using any tool). Presence can involve the use of electromagnetic interactions/signals can be, for example, any electromagnetic signals (e.g., radar, low-frequency signals, high frequency signals or radio-frequency identification) or visual information (e.g., any camera of the vehicle that can detect the presence of one or more person within a chosen acceptable distance/proximity to the vehicle), which may be received, captured or detected using any suitable means (e.g., any antennas 102, transmitter/receiver, motion sensor, or camera of the vehicle) such as a detection system of the vehicle or any suitable interaction detectors 201 (i.e., a collection of any suitable device that can be used as sensors, for example: radars, light detection and ranging (Lidar), proximity sensors, motion sensors, cameras (conventional, infrared, night vision, etc.), radio frequency antennas (e.g., low frequency, high frequency, NFC and/or RFID), etc.).

In some embodiments, a behavior of the vehicle can be detected by the proposed device or system and used as a chosen trigger (e.g., detection of intended use).

In one of the preferred embodiments of the proposed device or system, the intended use can be detected based on the communication behavior of the vehicle, e.g., the radio frequencies generated by one of more antennas 102 of the vehicle. In one embodiment, a suitable radio frequency receiver 201' of the proposed device and apparatus can detect and/or identify various radio signals (e.g., challenges) generated and broadcasted by the antennas 102 of the vehicle. Depending on the embodiment and/or the type of vehicle, the signals these radio signals can belong to the LF, HF, NFC, RFID or Bluetooth® frequencies. It will be appreciated that the suitable radio frequency receiver 201' may be one or more receiver (or transceivers) that can be selected based on the type or model of vehicle to ensure that it can detect in the frequency range of the vehicle's antennas 102. In fact, in one embodiment, the proposed device can detect one or more challenge signals (e.g., LF key localization challenge and/or NFC and/or RFID signals) from the car's antennas 102 and thereby determine the intended use of the vehicle (i.e., that someone is attempting to access or interact with the vehicle).

Various embodiments that can provide improved vehicle security are presented herein, but most of them can essentially comprise the following principal steps: A) detect interaction (i.e. an intended use) with the vehicle, B) disable at least one of the vehicle features and/or controls, and C) authenticate an authorized user. It will be appreciated that these steps can be arranged in various orders depending on the embodiments, and additional steps or sub-steps can be added if required, with the effect or the result that the additional authentication is used to control whether the vehicle use is disabled or not.

The proposed methods can be implemented in software (e.g., a computer-readable program or algorithm stored in memory and executable by a processor) or into hardware (e.g., logic circuitry) or in an operating protocol of any suitable service or device (e.g., for an anti-theft device and/or for a central server).

The detection of the interaction of step A) can be completed a detection module of the proposed anti-theft device or system and can be identified/identify/acknowledged using any suitable data processing (e.g., Boolean values, neural network, artificial intelligence and/or thresholds).

For step B) of disabling the vehicle features and/or controls, it must be understood that, in the present disclosure, the "vehicle controls" refer to any function, command/instructions (e.g., signals, protocols or data) or hardware (antennas, brake pedal, engines, door handles, windows, trunk, locks, etc.) that can be used to change or activate any functions or state (e.g., control, access, use, lock/unlock, power ON, ignite or move the vehicle) of the vehicle, some of which are generally controlled by the vehicle's PKES system).

The disabling of the vehicle controls can include preventing or disrupting the usual/normal PKES system's operation that usually enables starting the vehicle For example, this disabling can be achieved by disabling the Start/Stop button 110 or the brake pedal sensor 112 often required to turn on the engine). An alternative way to disrupt the PKES system's ability to start the vehicle can be achieved by sending messages on the vehicle bus in a manner that prevents the exchange of messages on the bus for the starting of the vehicle to take place. The disabling of the vehicle controls may also comprises preventing unlocking of doors or of the trunk, or preventing the opening of the windows.

It will be appreciated that the disabling of the vehicle controls can comprise actively disconnecting any relevant hardware component of the vehicle, such as any wires that may be used to exchange signals/data with another hardware or software component of the vehicle controls.

In some embodiments, the disabling/disconnecting of one component of the vehicle controls can comprise opening one or more relays or switches 286 (see FIG. 3D) that may be added to the circuitry of that component thereby preventing this component from being used to access or control the vehicle. For example, a switch (e.g., installed on a communication wire) can be used to reactively/actively and physically isolate any desired component of the vehicle controls (e.g., antennas; or Start/Stop button) from the rest of the control system (e.g., the PKES system), thereby preventing information (e.g., an unlock command normally received by these antennas and sent via communication wires; or a signal to start the vehicle engine) from reaching another component (e.g., the PKES controller; or engine starter—e.g., ignition—) of the vehicle controls that would normally react according to this information upon reception of this information (e.g., unlock command).

In some embodiments, the disabling that can prevent or disrupt the usual/normal PKES system's operation may be achieved by sending an intelligible and validly formatted response to a challenge communication, also known as a null message, that contains an incorrect response that will cause the PKES controller to conclude from the communications (e.g., radio frequency and/or wired communications) between various components of the vehicle's system, or between the vehicle and a vehicle access (e.g., a vehicle's key or key fob) that access to the vehicle or starting of the vehicle cannot be authorized. Thus, the validly formatted null message may contain the expected header and format of a response to the PKES controller.

With most PKES systems currently in use, the key fob receives a challenge message that identifies the vehicle and includes a challenge. The challenge can take a variety of forms, and in some cases it can be a pseudorandom number that the fob will transform into another value, the response, that when received by the PKES system will permit it to authenticate the fob. The fob will not choose to respond to a challenge if the vehicle identifier is not recognized as being associated with the key fob.

In some PKES systems, the key fob response is transmitted in a given time slot based on a clock reference established by the challenge message. Each key fob is programmed to transmit in a time slot assigned only to the given key fob. This prevents two fobs for the same vehicle from transmitting their responses at the same time and corrupting the response data received by the PKES system.

By transmitting in the time slot assigned to a key fob, transmitter 281" can effectively alter the response data received from a fob by the PKES system controller 106 and prevent the vehicle from being operated since a valid response is not confirmed. Such transmission can be called a null message. The null message can be transmitted in each time slot associated with all key fobs to prevent use of the vehicle when authentication of the user device, e.g., the smartphone app 260, is not achieved.

When a user has an extra key fob, it is also possible to exclude this key fob from the present theft deterrent system by not transmitting the null message in the time slot that is assigned to the extra key fob. Such a key fob could then be reserved for a guest who could then use vehicle 99 without having an authorized user device 260. However, such an extra key fob could pose a theft risk through a relay attack if it is not safely stored, for example in a Faraday pouch or box, with its battery removed, or in a location that is not close to an accessible location for the thief.

A null message can include a response message detected or recorded from the vehicle's own fob, thus containing a payload that has a valid response to an old challenge that will be incorrect when the null message is transmitted. This is done without disrupting or jamming the radio frequency communications (e.g., access, localization, identification signals-queries and answers-) between the vehicle system (e.g., the vehicle's antennas 102) and the key fob.

For step C) of authenticating an authorized user can comprise: validating the authenticating credentials (e.g., by exchanging personal ID data stored on the authorized smartphone) of a personal identifying device (e.g., smartphone) or secondary/alternative/emergency personal identifying device (e.g., a Bluetooth®, an NFC and/or an RFID device) of the authorized user; validation of a satisfying proximity between the personal identifying device of the user and the vehicle; requiring (e.g., with the personal identifying device or through the smartphone app) an active (i.e., when required, sometimes in the authentication process) authentication/identification input of the authorized user of (e.g., by asking to enter an identifying password or biometrics on an app on the personal identifying device—e.g., smartphone—); or a combination thereof.

In the event that the user's authentication device, such as a smartphone, loses power, an auxiliary authentication device may be used. A Bluetooth® token (e.g., battery powered) may be used, or with the addition of a suitable reader, the user may use an RFID tag or card or NFC communication of the smartphone so that a passive device may be used without needing battery power. In some embodiments, authentication may be provided by an secondary/emergency/alternative personal identifying device 265 (e.g., a batteryless and passive or active device or such as a Bluetooth®, an AirTag, an NFC and/or an RFID device/tag/badge) in order to allow the authorized user can be authenticated and to use the vehicle when the first/principal personal identifying device cannot be used (e.g., when the user's smartphone runs out of battery). It will be appreciated that the proposed device can therefore be equipped with a corresponding identification device (e.g., secondary ID device) reader or a transceiver to communicate with the ID device (e.g., an ID device reader 289 of FIG. 3E) enabling the communication with and detection or authentication of any chosen alternative personal identifying device. For example, the user could be required or choose to place the alternative personal identifying device near the anti-theft device or around a specific location (e.g., well identified, well known or hidden location) within the car's interior to authenticate himself and satisfy the double authentication requirements.

Background mode authentication in which authentication is automatic, is more convenient over foreground mode authentication that requires user input to confirm authentication (e.g., using a code or biometrics). However, in some cases, the added security of user input to confirm authentication is of value.

The validation of a proximity between the personal identifying device of the user and the vehicle is optional. When short-range wireless communications are used, such as Bluetooth®, the range of the communications may be sufficiently limited to permit authentication when within range, since the authorized user is close enough to the vehicle. Alternatively, even when Bluetooth® is used, proximity can be validated either by signal strength or by using location detection such as GPS or location services on a smartphone. Such validation of proximity may comprise the sub-steps of: 1) determining a relative distance/position between a user's personal identifying device and 2) assessing if the determined relative distance/position respects a proximity requirement (i.e., is the relative distance smaller or equal to a maximal allowed relative distance).

The relative position (distance) between the personal identifying device of the vehicle user and an anti-theft device inside the vehicle may be used to determine if the authorized user is close enough (e.g., respects the proximity requirements) to be considered as the source of the detected interaction.

It will be appreciated that the proximity requirements (e.g., maximal allowed relative distance) may be adjusted as required (e.g., set a default value or selected by the user or owner or "main user") and can be used any possible means of determining relative distance or positions (e.g., using glocalization, triangulation, a strength of a signal, or other).

Figure 2A:
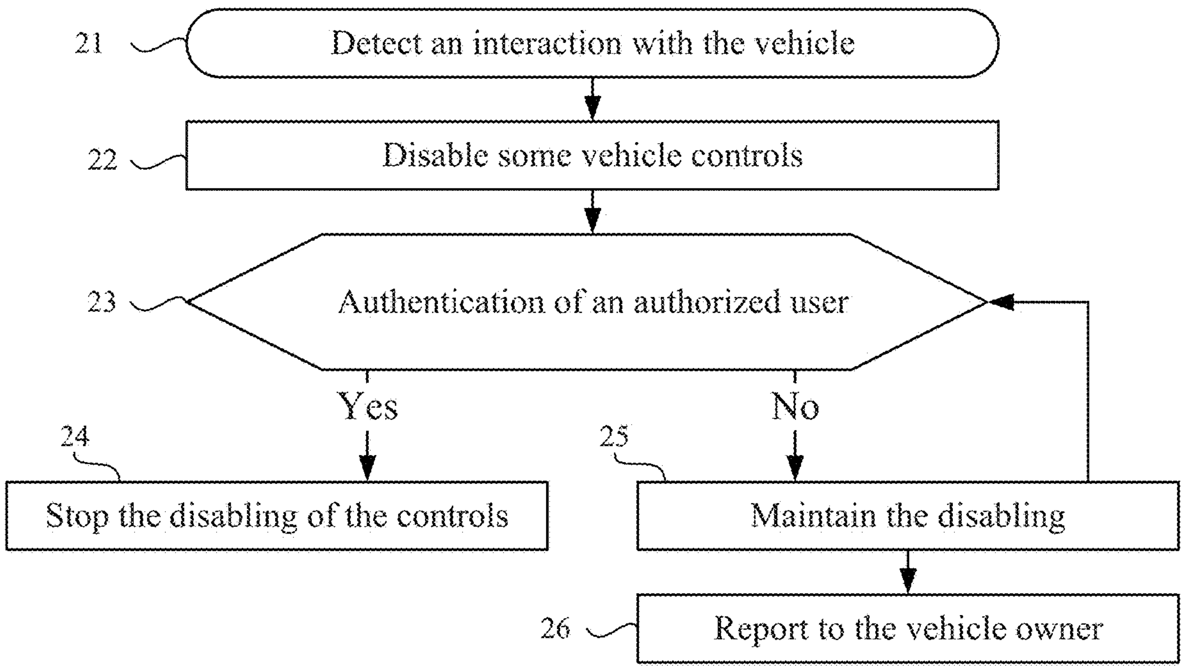
FIGS. 2A and 2B present flowcharts of possible protocols of the anti-theft device or system providing additional security to vehicles by ensuring that only authorized users can get access or use a vehicle.

FIG. 2A presents a flow chart of one embodiment where step b) 22 of disabling some of the vehicle controls is initiated as soon as any interaction is detected and before the step c) 23 of validation of the authorized user's proximity is completed.

In the exemplary embodiment of FIG. 2A, the method or protocol may be initiated (e.g., triggered) by an interaction with the vehicle that can be detected in the first step A) 21 of this embodiment using any suitable needs available to the anti-theft device.

In some embodiments, once an interaction is detected, the nature and/or source of the interaction may be assessed/determined. A detected interaction may be classified/categorized as a suspicious interaction (e.g., an individual is approaching or touching the vehicle) that needs investigating and/or requires the anti-theft device or system to protect against. A detected interaction may be classified/categorized as a false alert (false positive) or as a non-security risk interaction (e.g., a cat that triggered a proximity sensor/detector).

In some embodiments, step B) 22 of disabling the relevant vehicles controls may be completed immediately after detection of any interaction or may be completed after the nature and/or classification of the detected interaction or level of the security threat is assessed.

It will be appreciated that, in some embodiments, the degree of vehicle controls disabling may have different levels of security, which can be adjusted according to various criteria/conditions (e.g., depending on the level of the security threat of the detected interaction).

In the embodiment of FIG. 2A, after the vehicle controls are disabled (step 22) thereby ensuring security of the vehicle by preventing anyone to access or control the vehicle before being authenticated, the authentication step C) 23 can be completed to ensure that an authorized user is in satisfying proximity (close enough from the vehicle to be at the origin of the interaction).

Step C) 23 can be completed by means of communications (e.g., signal or data exchanges) between the anti-theft device or a central server and the personal identifying device of the authorized or new user. This may be completed using a communication interface.

Step C) 23 can include two principal verification steps that may be completed in any desired order, which may be a proximity verification sub-step and a sub-step of authenticating a user's identity.

In some embodiments, the proximity verification can be used to ensure that a user or his personal identifying device (e.g., smartphone) is near enough the vehicle to respect proximity criteria (e.g., located closer than a maximum allowed distance from the vehicle and/or located inside the vehicle), which may be based on the interaction detection/interpretation/classification in some embodiments.

In an embodiment, the proximity verification may be done using biometrics (facial traits using a camera, fingerprint using a sensor, voice using a microphone, etc.) of authorized users.

For example, a camera of the security device may be used to capture one or more images of the inside or the surroundings of the vehicle and these images may then be analyzed or processed using any suitable image recognition program, algorithm or neural network to analyze the features (e.g., the biometrics of the person's face) of the person interacting with the vehicle and classify between a known/authorized person, thereby authenticating that person, or an unknown/non-authorized person.

It will be appreciated that the image recognition can further be used to determine/approximate the position of the photographed person (e.g., using the relative size of an object of the surroundings or the inside of the vehicle, or using triangulation with more than one camera).

In some embodiments, the proximity verification step is preferably completed before the authentication step since there may not be any need to authenticate the user if no known user is within satisfying proximity thereby would not have granted access to the vehicle controls even if authenticated as an authorized user.

If the authentication step does identify or confirm that the person at the origin of an interaction with the vehicle is an authorized user and is in proximity with the vehicle, the disabling of the vehicle controls can be interrupted/stopped 24, thereby allowing the use of vehicle controls (e.g., use of the key fob).

If the authentication step does not identify or confirm that an authorized user is in satisfactory proximity with the vehicle, the vehicle controls can remain disabled 25, a report of the situation may be sent to any desired entity (e.g., the vehicle owner, vehicle users, system administrator, central server or to any suitable authorities) 26, step C) 23 may be repeated continuously, periodically and/or upon request(s) by a user or server (e.g., thereby allowing an authorized user to get closer to the vehicle to respect the proximity requirements or for the position/distance measuring devices/function to update its location), or a combination thereof.

It will be appreciated that the reporting 26 may alternatively be a triggering signal, that can trigger an alarm system of the vehicle and/or may trigger the start of a recording using any available cameras 288 (e.g., integrated camera of the vehicle, an aftermarket camera connected to the car and/or the anti-theft device, or a camera of an embodiment of the vehicle security system comprising any camera). In some embodiments, the recording and/or live feed of the cameras may be sent to any desired entity (e.g., as part of the report of step 26).

Figure 2B:
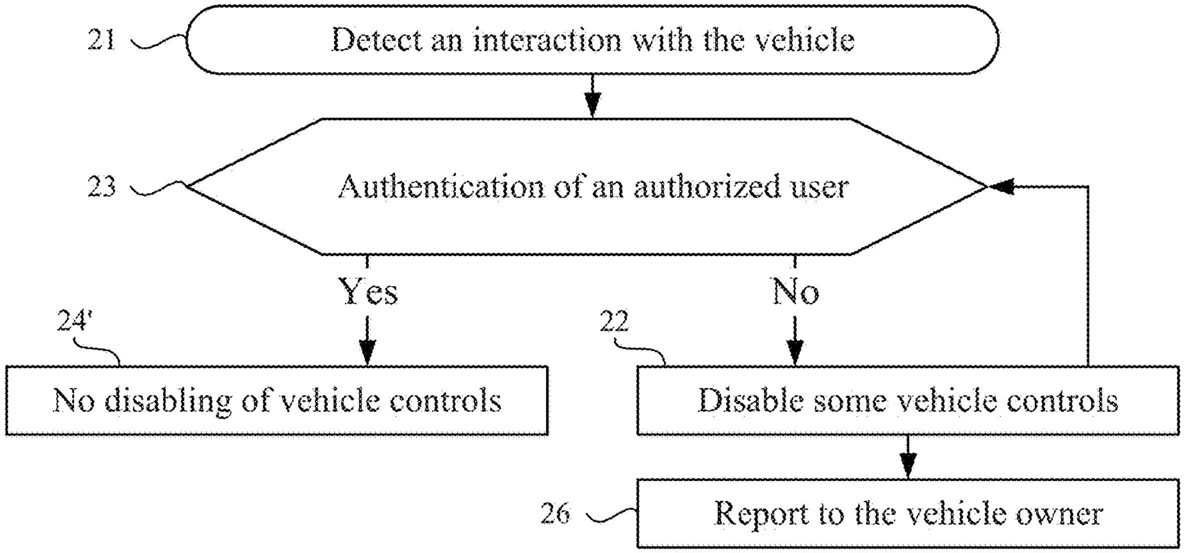

Alternatively, FIG. 2B presents a flow chart of one embodiment where step B) 22 of disabling some of the vehicle controls is initiated after step C) 23 of validation of the authorized user's proximity is completed (e.g., only once the absence of any authorized user is confirmed). In this embodiment, step 23 may be completed as soon as any interaction is detected in order to ensure a response time of step 22 initiating.

If any authorized user is authenticated, there may not be any need to initiate step 22, so that no disabling 24' is required.

For example, upon detection of an interaction, e.g., when a signal (e.g., high-frequency signal or radio-frequency identification signal) is detected or when a person is detected near the vehicle, the PKES system or control functions of the vehicle (e.g., opening the doors/windows or starting the engine) are actively disabled or jammed while probing for and detecting the presence of the authorized user of the vehicle near or in the vehicle, before ending/terminating the current/active disabling once this presence is confirmed.

It will be appreciated that some embodiments (not shown) could complete the authentication step 23 prior to detecting the interaction (e.g., through constant Bluetooth® challenges). In such embodiments, this could allow to complete the disabling step 22 as soon as the interaction is detected since no authorized users are yet authenticated and, alternatively, the disabling step 22 may not be completed at all if an authorized user has already been authenticated.

Figure 2C:
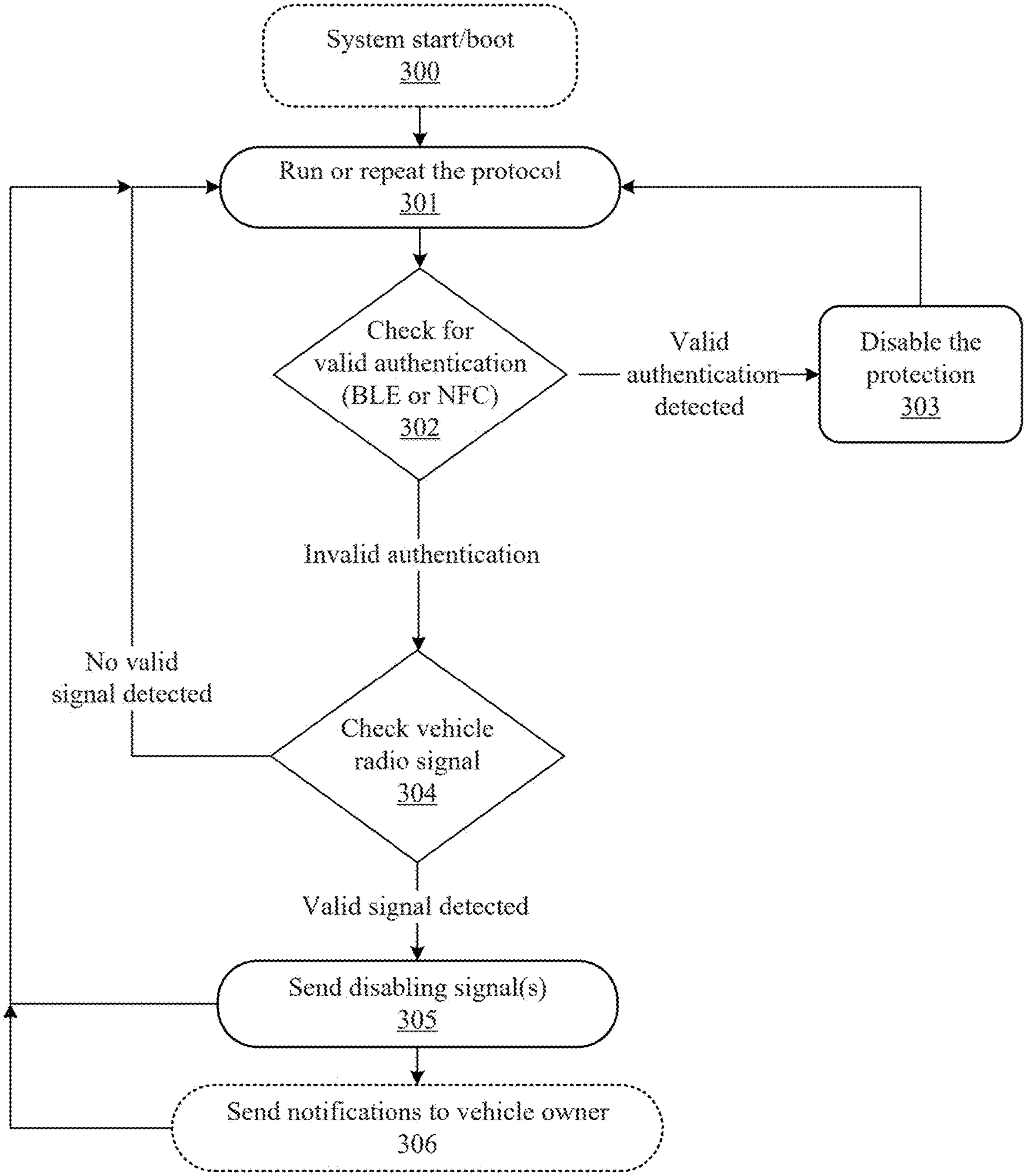
FIG. 2C presents flowcharts of one of the preferred embodiments of a protocol the anti-theft device or system.

Now referring to FIG. 2C that shows the flow chart one of the possible preferred embodiments of one of the various possible protocols that the anti-theft device or system can follow to provide desired protection. In the embodiment illustrated in FIG. 2C, the disabling can be achieved by listening, detecting and responding to radio frequency signals/communications from the vehicle and may be conditional to the absence of valid authentication (i.e., the disabling is activated while no valid authentication is detected), but the disabling and/or the authentication could be any of the alternatives described herein or known in the art.

Once the system is activated (after completing step 300 of starting and booting the system/device), the device or system of FIG. 2C can perform the presented protocol (run the protocol, step 301) constantly, periodically and/or, optionally, when triggered (e.g., when an interaction—intended use—is detected).

In some embodiments, the protocol can comprise an authentication step 302, where the device or system scans for (e.g., communicates with or sends challenge signals to) any compatible (e.g., new, known, etc.) personal identifying device or any alternative identifying devices. The proposed device or system can exchange or determine information (e.g., distance with the device, geo-positions, authentication credentials, controls commands, security preferences, etc.) with any of the identifying devices, which can be used when in assessing if an intended user is an authorized user and to validate/confirm that the authorized user is in sufficient proximity to the vehicle for the anti-theft device to disable the protection (step 303), thereby enable normal operation/behavior of the vehicle (i.e., normal interaction between the key and the PKES system of the vehicle). It will be appreciated that, although the authentication is shown as being a first step of the embodiment shown in FIG. 2C, the authentication may be a later step. For example, the authentication of the authorized user may be completed in response to or once the intended use is detected (i.e., once step 304 is completed and once a valid radio signal is detected).

In some embodiment, the protocol can comprise signal monitoring step 304, where the device or system monitors one or more ranges of radio frequencies (e.g., one of more frequency range normally attributed to Bluetooth®, LF, HF, ultra HF (UHF), NFC, RFID, etc.) using any suitable radio frequency detection or reading devices (e.g., one or more radio, LF, HF, NFC, RFID, Bluetooth® receivers or transceivers) in order to detect or intercept a radio signal of any of the vehicle's antennas 102. When a signal (e.g., communication or challenge) from the vehicle is detected or identified, the protocol may consider that an intended use has been detected and can start a corresponding protocol. In one embodiment, when no valid authentication has been identified, the protocol may send one or more disabling signals to be received and processed by the vehicle.

The "disabling" signal sent by the anti-theft device or system can generate/send one signal, a plurality of signals or a sequence of signals aiming to disrupt, abort, disable, jam and/or intercept. "Jamming" can include the wireless transmission of noise that prevents a wireless receiver from functioning properly to receive an intelligible signal. While such "jamming" may be acceptable, in particular when the range of the "jamming" transmission effect is limited to the vehicle itself and no other neighboring vehicles can be adversely affected, it can be prohibited in certain jurisdictions. Therefore, in some embodiments, the "disabling" signal can be a wireless transmission that does not interfere with the functioning of the wireless receiver, but instead will cause the data received to be corrupted in a manner that does not cause the wireless receiver to malfunction, but instead will cause the processing of the data at a higher level to result in disruption. In some embodiments, the disabling signal can be any suitable radio signal (one of more frequency range normally attributed to Bluetooth®, LF, HF, ultra HF (UHF), NFC, RFID, etc.) compatible with the desired equipment/component of the vehicle. In some embodiments, the disabling radio signal can comprise any code compatible with the vehicle, which can be a null code/message (e.g., a null original equipment manufacturer code) or a lock-and-arm command code and may vary based on the type or model of the vehicle. For example, in some embodiments, the protocol can cause the anti-theft device or system to send a null original equipment manufacturer code to one or more suitable antenna 102 (e.g., UHL receiver or transceiver) of the vehicle through UHF (e.g., sun GHz radio frequencies) using a UHF transmitter and a null original equipment manufacturer code to the one or more suitable antenna 102 (e.g., LF receiver or transceiver) of the vehicle through LF (e.g., about 125 to 132 kHz radio frequencies) using a LF transmitter or transceiver, which may be sent sequentially or simultaneously.

In some embodiments, the protocol may optionally complete step 306, thereby causing the anti-theft device or system to send one or more notifications (e.g., alerts, any relevant information and/or reports) about an event (e.g., successful authentication, detected unauthorized attempts or entry, etc.) to the vehicle owner (e.g., to and/or through his personal identifying device) and/or to any involved party (e.g., all of the authorized users).

Figure 3A:
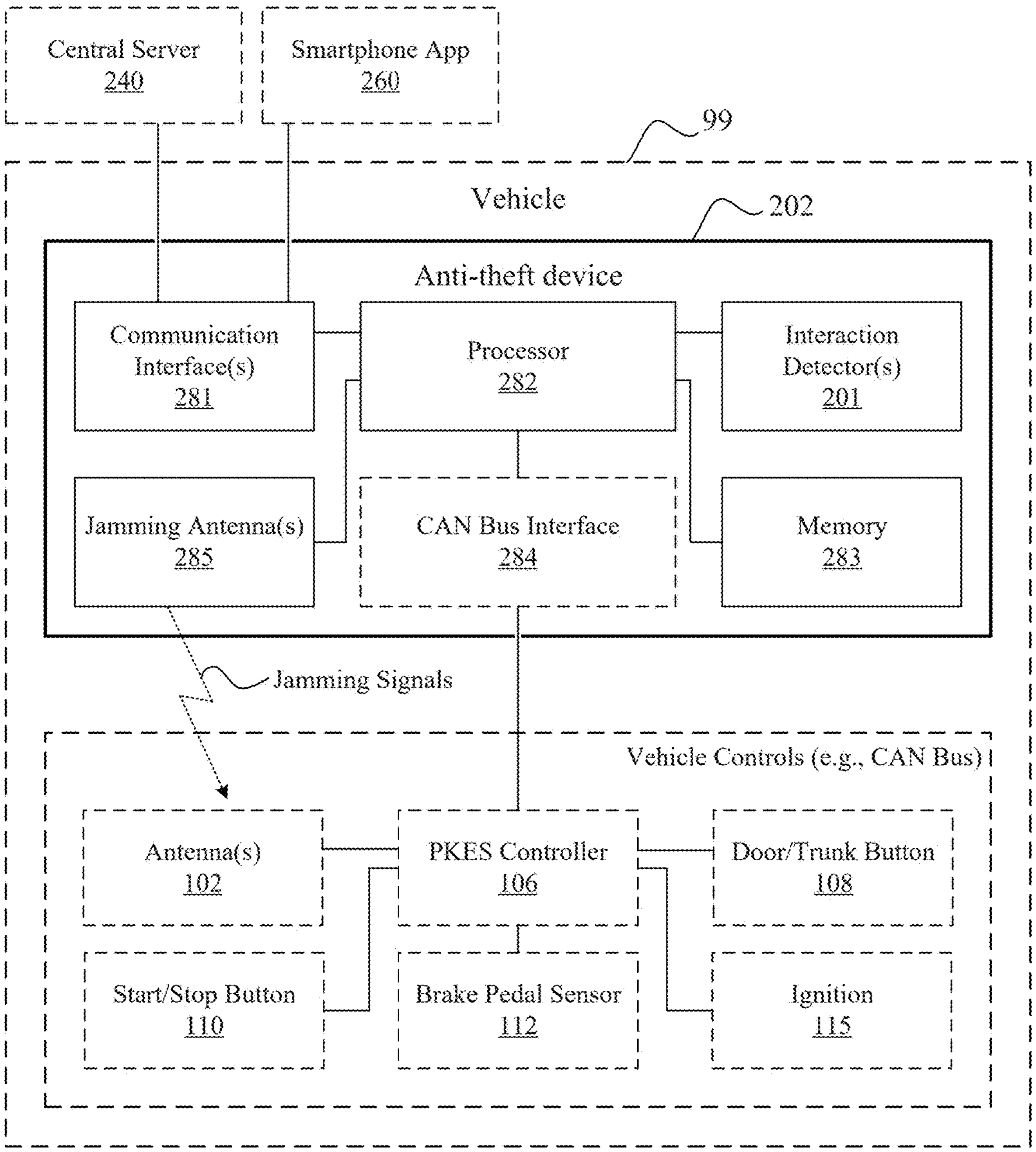
FIGS. 3A, 3B, 3C, 3D are block diagrams of various embodiments of an anti-theft device to be installed in the vehicle for ensuring that only authorized users can get access or use a vehicle.
Figure 3B:
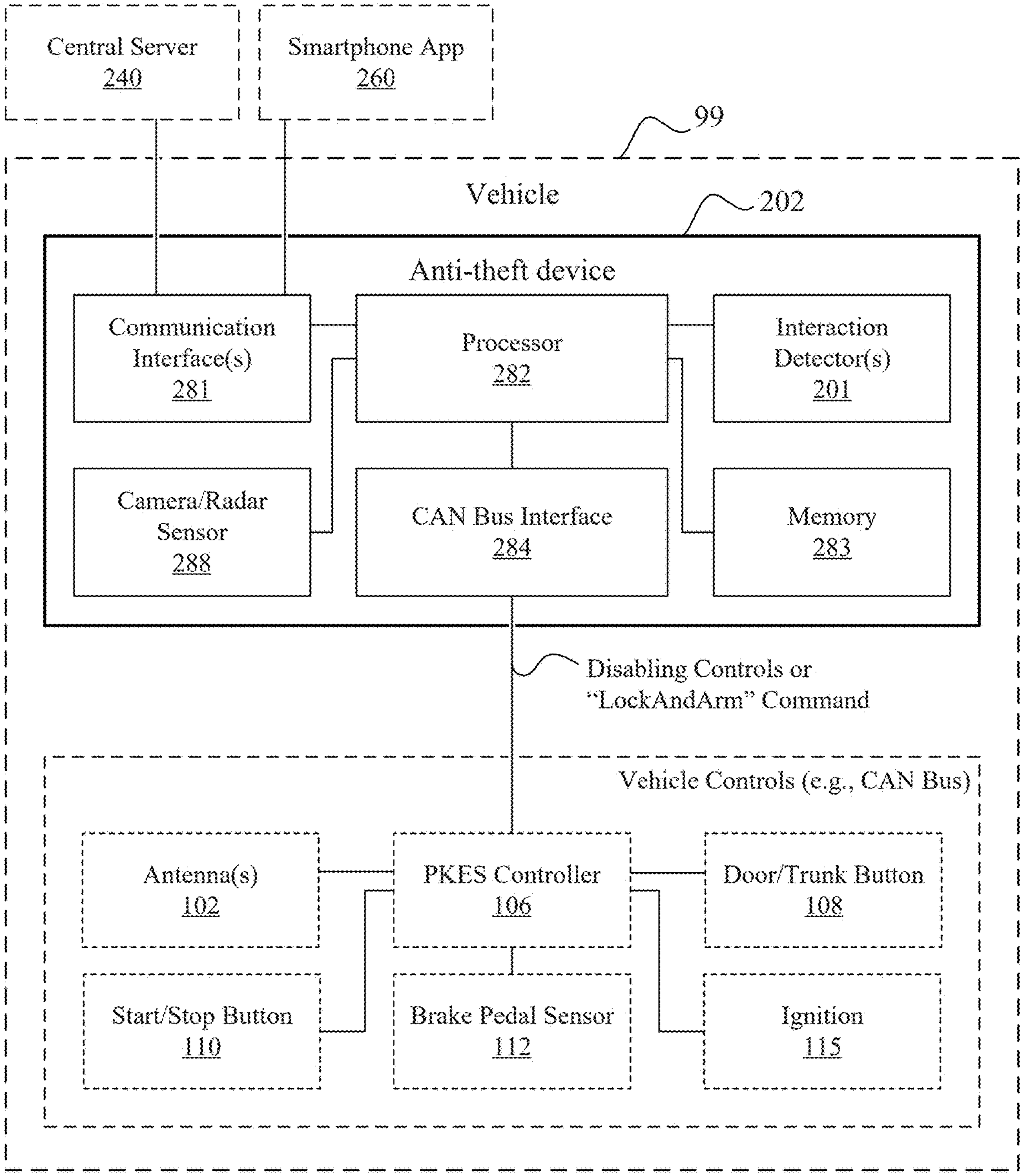
Figure 3C:
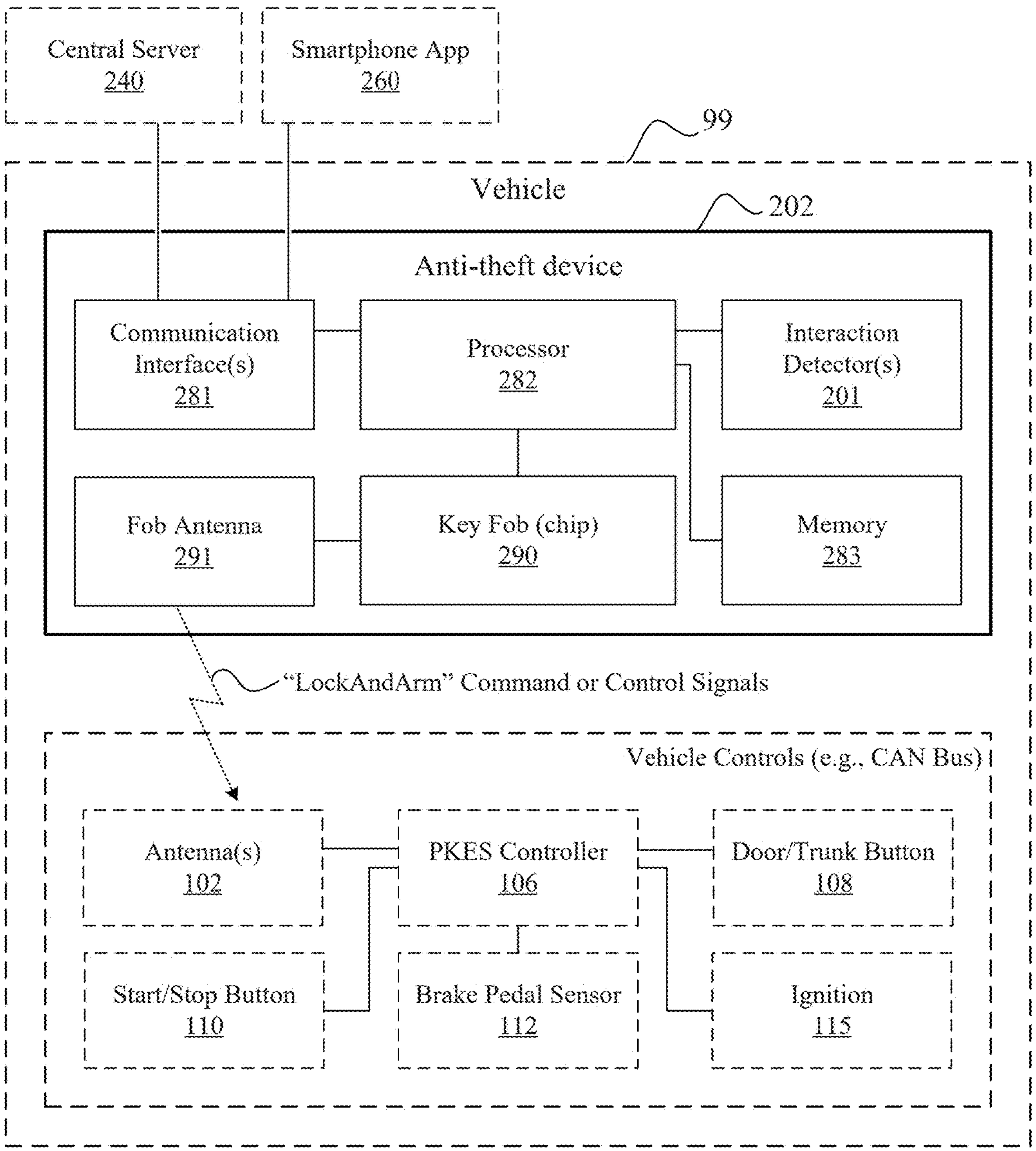
Figure 3D:
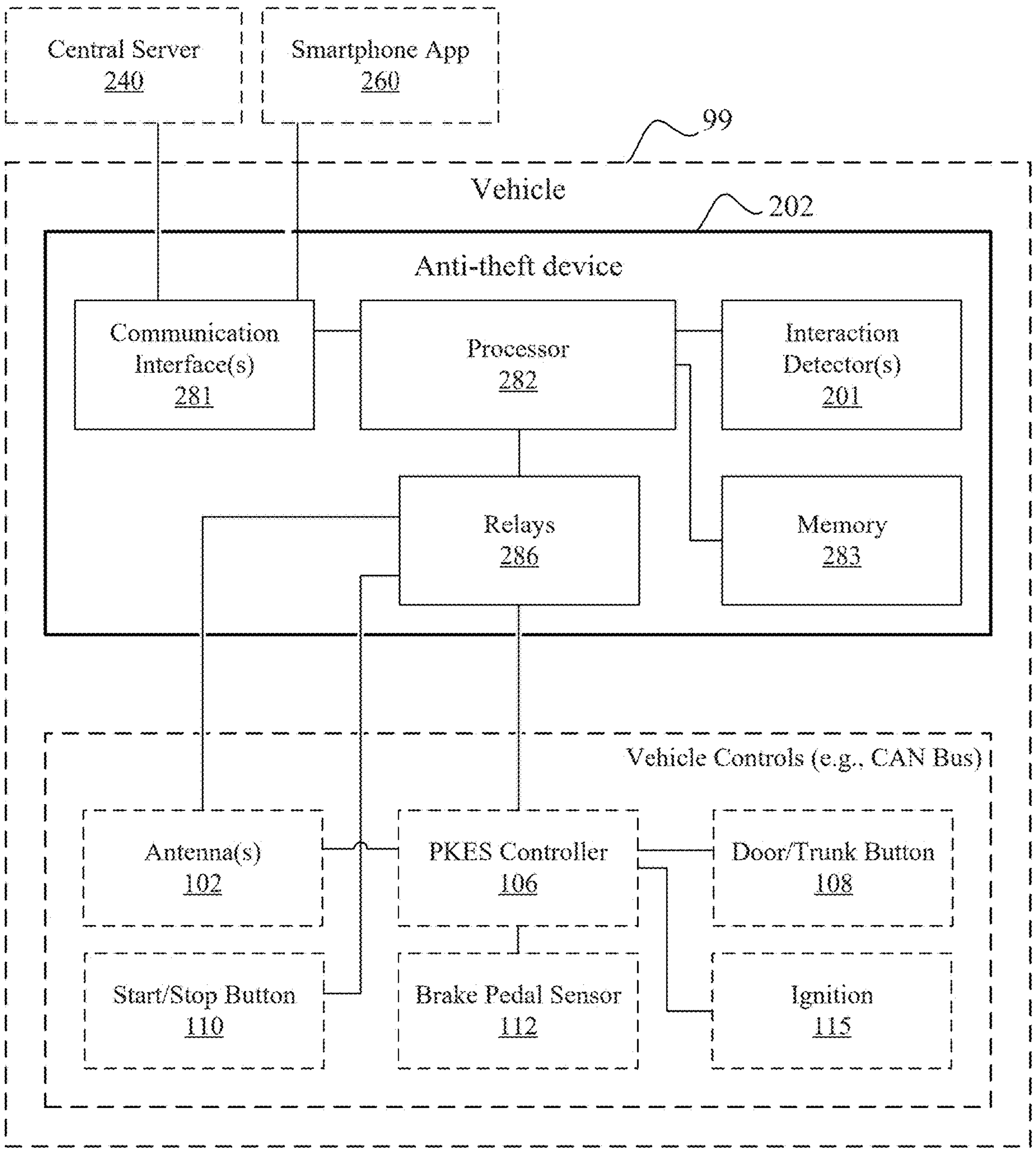

FIGS. 3A, 3B and 3C present block diagrams of an anti-theft device 202 (modular, portable, or integrated into the vehicle-aftermarket or stock-) to be installed in vehicles 99 for ensuring that only authorized users can get access to or use a vehicle 99.

The device 202 can include one or more communication interfaces 281, a processor 282, memory 283, CAN bus interface 284, and one or more jamming antenna 285. Any of these may be configured to exchange (send and/or receive) relevant data information with one another.

The device 202 can comprise one or more of a processor 282, which may be any suitable general-purpose programmable hardware (central processing unit (CPU), logic circuitry, microprocessor, DSP, FPGA, etc.). While the processor 282 is shown as being unitary, it may also be multicore, or distributed (e.g., a multiprocessor).

The memory 283 of the device 202 can be any suitable type of memory known in the art (random-access memory (RAM), read-only memory (ROM), solid-state drive (SSD), hard disk drive (HDD), etc.), or a combination thereof, and can be used to store operation codes, instructions and programs to execute the required steps of at least one embodiment of the proposed method.

The CAN bus interface 284 of the anti-theft device 202 can be any suitable interface (USB, connection cables, remote access interface/application, internet, ethernet, Wi-Fi, Bluetooth®, mobile network, etc.) that may be used to connect with any external or internal component of the anti-theft device 202 can and may be used to send any required signal, data or command (e.g., disable or "Lock-and-arm" command).

Depending on the requirement of the various embodiments, the CAN bus interface 284 may be connected to vehicle controls of the vehicle 99 which can include, but are not limited to, the PKES controller 106, the door or trunk button 108, the Start/Stop button 110, the brake pedal sensor 112, the ignition 115, or a combination thereof. The configuration of a PKES controller 106 may accept a bus command that will reset or override a previous bus command used in accordance with the second and third common forms of attack mentioned above, and in such case, interface 284 can send such a reset or override bus command. However, when no such reset or override bus command is available, interface 284 can send continuously enough messages on the bus to prevent other messages used by system components to start the vehicle. This is a form of bus jamming. For example, the bus message sent by the push-to-start button when a thief attempts to use the vehicle in accordance with the second common form of attack can be prevented from reaching the PKES system.

The communication interface 281 of the anti-theft device 202 can be any suitable communication interface (USB, connection cables, remote access interface/application, internet, ethernet, Wi-Fi, Bluetooth®, mobile network, etc.) that may be used to exchange signals and information with the required external components, which can include, but are not limited to, a central server 240 or a smartphone app 260 (i.e., communication interface of any personal identifying device) on the smartphone of a vehicle user, or a combination thereof.

The communication interface 281 may be configured to allow for geo-localization or proximity detection of the location of the smartphone of the user relative to the location of the vehicle 99. A Bluetooth® connection between the smartphone and the anti-theft device 202 may be used to allow the device 202 to determine the proximity of the user and smartphone through communications with the smartphone app. In some embodiments, the smartphone app may provide Global Positioning System (GPS) coordinates to the anti-theft device 202 when the device 202 can have access or communicate with a GPS system of the vehicle 99 (not shown).

The relative distance or position between the vehicle 99 and the personal identifying device of the authorized vehicle user can be determined (i.e., calculated and/or computed) by the personal identifying device (e.g., through the smartphone app), the anti-theft device 202 (e.g., the processor 282), or a combination of the two.

It will be appreciated that some embodiments may further verify that the access to the vehicle 99 is provided according to the position of the user and smartphone relative to the vehicle 99. For example, only the door on the same side of the vehicle 99 where the user is located may be unlocked (e.g., only the left doors are unlocked when the user is on the left of the vehicle 99 or only the trunk may be unlocked if the user is detected at the rear of the vehicle 99).

In one embodiment, the anti-theft device 202 may be battery powered and can therefore comprise a battery unit (not shown) or a battery hosting housing and connections (not shown). The housing may be suitable for mounting under a dashboard or under the hood in an engine compartment of vehicle 99 without being too easy to locate by a thief.

In one embodiment, the vehicle security unit 202 may be powered by the vehicle 99 itself (i.e., the vehicle battery, not shown) through electric cables.

The exemplary embodiment of FIG. 3A is a vehicle security unit 202 that can be used to prevent an unauthorized use of electromagnetic signals (e.g., low-frequency signals, high frequency signals or RFID) that may be used to maliciously access or control the vehicle. Such embodiments can comprise a communication interface 281, interaction detectors 201, a processor 282, memory 283, and one or more jamming antenna 285, where, when the step of disabling of the vehicles control 22 is executed, the jamming antenna can be used to jam the surrounding environment (e.g., low-frequencies or high-frequencies) thereby preventing electromagnetic signal exchanges with the vehicle 99 (e.g., with the PKES controller 106 or antenna 102). Some embodiments may comprise a CAN bus interface 284 for communicating or controlling vehicle controls but can be optional.

It will be appreciated that some of the embodiments can comprise various types of antennas (not shown) that may be used as a receiving antenna to detect an electromagnetic interaction attempt with vehicle 99. In some cases, a signal detected by the receiving antenna may be used to select or narrow down the electromagnetic spectrum that needs to be jammed by the jamming antenna.

For example, the wavelength/frequency of an incoming signal—e.g., command from a key fob—can be analyzed to determine its frequency range and a jamming signal can be generated only for the determined frequency range, thereby preventing undesired jamming of other frequencies and components of the vehicle or of the personal identifying devices).

In one embodiment, the vehicle anti-theft device 202 may be powered by the vehicle 99 itself (i.e., the vehicle battery, not shown) through electric cables.

The exemplary embodiment of FIG. 3B is a vehicle anti-theft device 202 that can be used to prevent most unauthorized use the vehicle. Such embodiments can comprise a communication interface 281, interaction detector 201, a processor 282, memory 283, and a control interface (e.g., CAN bus interface 284) for communicating or controlling vehicle controls. In a preferred embodiment, the control interface of the vehicle anti-theft device 202 can be a CAN bus interface 284 that connects to one or more bus (e.g., vehicle system control bus), which may be part of a PKES system (e.g., PKES control bus 106). When the step of disabling of the vehicles control 22 is executed, the CAN bus interface 284 can send a disabling or "Lock-and-arm" command to the bus it is connected, which can result in the disabling of the bus itself thereby disabling at least some of the vehicle controls, for example.

In FIG. 3C, the interaction detector 201 can comprise a wireless challenge message receiver that senses when the PKES system sends a challenge message to the OEM key fob. This is typically done when the door button is actuated (i.e. a door contact or sensor part of a door handle or a contact or sensor separate from a door handle) or when the push to start button is pushed. This can prompt a camera, such as a dash cam 288, to acquire an image or video. If the authorized user's device 260 is not authenticated using interface 281 and determined to be near the vehicle, then the image or video may be sent to the central server 240 and/or the user's device 260 as an alert.

In addition to a wireless detection of the low frequency (LF) challenge message, detector 201 can be connected to listen to a bus of the vehicle to detect when the PKES system sends a message to the LF transmitter component in the vehicle for sending the challenge message. This detection of the command on the bus is then taken as a detection of the LF signal.

As mentioned above, interaction detector 201 may include a camera for determining if a person is near the vehicle or in the vehicle. Other forms of proximity sensors may also be used. For the second and third common forms of attack, the interaction detector 201 may not always rely on the detection of a challenge message to know that there is an intended use. However, to inject a code into the vehicle bus requires that a thief be in or at the vehicle body. Dash cameras typically image the front of the vehicle, and many models also image the interior of the vehicle and the rear of the vehicle.

It will be appreciated that the "Lock-and-arm" function of the vehicle can be a native function of the vehicle that locks the vehicle altogether and can activate various native security features of the vehicles (e.g., arming an alarm system, activating a native "sentry mode"). In some PKES systems, a lock and arm command may result in a reset of a bus command used in the second and third common forms of attack.

The exemplary embodiment of FIG. 3C is a vehicle anti-theft device 202 that can be used to prevent most unauthorized uses of the vehicle. Such embodiments can comprise a communication interface 281, interaction detector 201, a processor 282, memory 283, a key fob chip 290 and a key fob antenna 291. When the step of disabling of the vehicle's control 22 is executed, the processor 282 can control the key fob chip 290 to active a desired function of the key fob (e.g., security functions, such as "lock-and-arm" command), which can be relayed to the vehicle controls (e.g., PKES system). The processor can control the key fob chip 290 so that it repeatedly sends a security command to the vehicle controls to prevent access and/or use of the vehicle.

It will be appreciated that the controlling of the key fob chip 290 by the processor can be achieved through various means, which can be a "direct" electric connection/control from the processor to the chip of the key fob or can be an "indirect" mechanical control (e.g., the processor may activate a robotic component—robotic "finger", piston, etc.—(not shown) that can mechanically control the key fob chip, via a button for example).

Figure 3E:
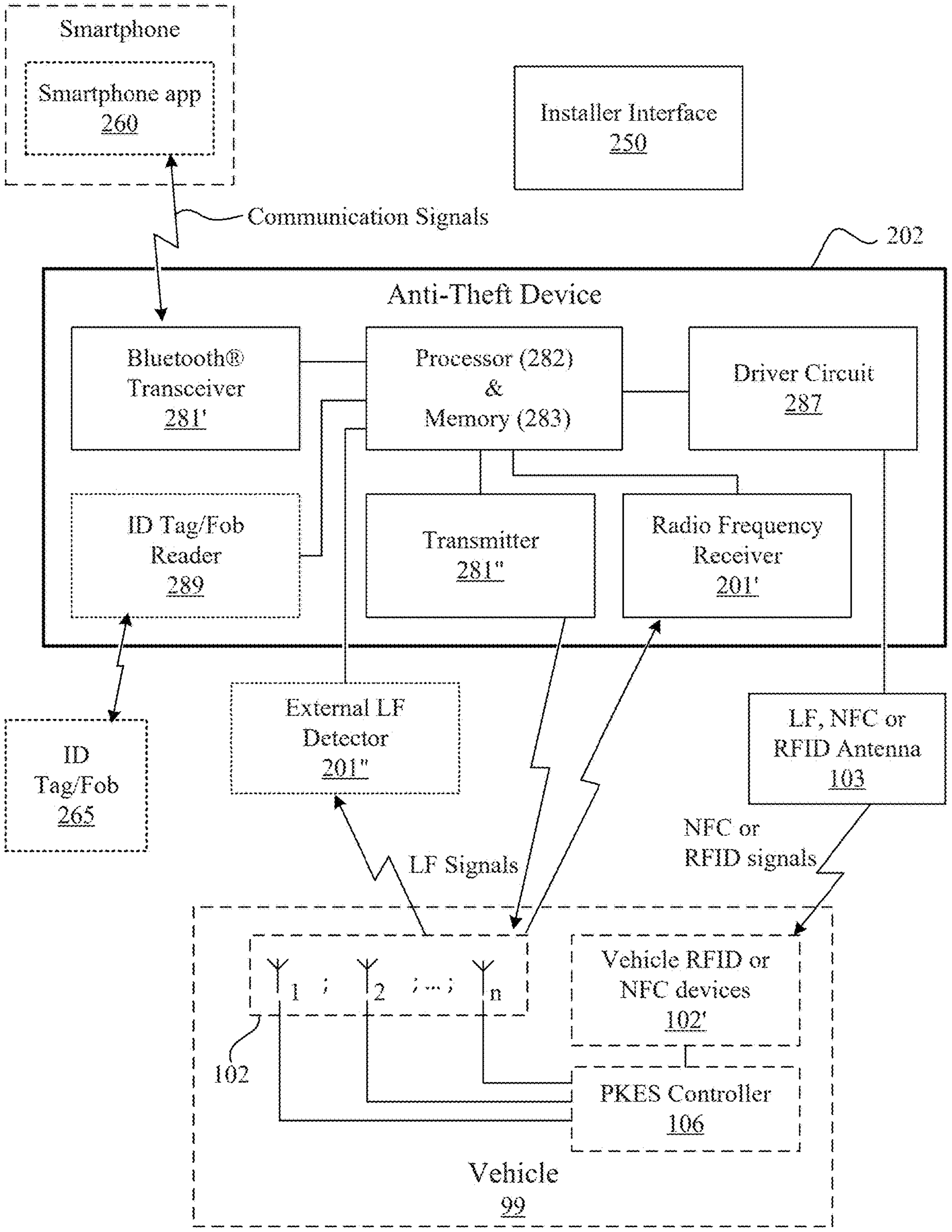
FIG. 3E presents a block diagram of one of the preferred embodiments of the anti-theft device or system.

FIG. 3E illustrates an embodiment of the proposed anti-theft device 202. The block diagram shows possible components of the anti-theft system comprising: the vehicle security or anti-theft device 202 (e.g., comprising: one or more Bluetooth® transceiver 281' (or any other suitable short-range wireless transceiver), the processor 282, the memory 283, a driver circuit 287 for driving and controlling one or more LF, RFID antenna 103, a ID reader 289 (e.g., Bluetooth®, LF, NFC, RFID and/or UHF transceiver) configured to read/identify a personal identifying device (e.g., a secondary personal ID device), one or more transmitter 281", a interaction detectors 201', and, optionally one or more external interaction detectors 201"), the identifying devices (i.e., the main and/or alternative/secondary personal identifying devices, e.g., the user's smartphone hosting the app 260 or an ID device 265, e.g., a secondary identifying device/tag/fob), and the relevant components/hardware of the vehicle 99 (e.g., comprising: a plurality of antennas 102, a vehicle RFID device/transceiver 102' and the PKES controller 106).

The antenna 103 may be external to the anti-theft device 202 and installed, for example under the dashboard of the vehicle, in proximity to the vehicles RFID reader 102' that reads the key fob (even when the key fob's battery fails) to allow the user to start the vehicle. It will be appreciated that the reader 289 is optional, however, is preferably located externally to unit 202 and mounted in a location accessible to the user on the dashboard or at the window of the vehicle.

While some components of the embodiments presented in FIGS. 3A to 3E are shown as being inside the main enclosure/housing of the anti-theft device 202 and some outside, it will be appreciated that some of the components (e.g., antennas, receivers, transmitters, transceivers, etc.) can be located inside or outside the main housing to improve signal communication.

The vehicle's RFID device 102' can be used to read the vehicle key instead of using the conventional radio signals of the vehicle and of the active RF receiver/transmitter of the key fob. The vehicle's RFID device 102', the position within the vehicle may differ from vehicle to vehicle and may be most commonly found in or next to the Start/Stop button or a cup holder or the dashboard, is significantly useful when the vehicle key fob runs out of battery, such that the vehicle can still identify the passive vehicle key. It will be understood that, in the context of the present disclosure, the vehicle's RFID device 102' can include any alternative/secondary key authentication system (e.g., UHF, LF, Bluetooth, etc.) that may not be limited to the frequencies of an RFID.

Once the activation and use of the vehicle antennas 102 is detected (e.g., by the receiver 201', the transmitter 281" (e.g., a UHF transmitter in the frequency range of less than about 1 GHZ) may be used/controlled by the processor 282 to send a null message in response to the detected challenge message transmission, so that the PKES controller 106 dismisses not only the null response but also any subsequently transmitted valid response from a valid key fob, including when the latter is done using a relay attack.

Once the activation and use of a vehicle RFID or NFC device 102' is detected (e.g., by the receiver 201'), the RFID transmitter or transceiver 103 (e.g., a LF TX antenna using frequency between about 125 to about 132 kHz) may be used/controlled by a controller (e.g., including the driver circuit 287 and/or the processor 282) to provide a null response message that will have the effect of causing the PKES controller 106 to reject the response and any other response transmission emitted by a key fob. When a thief attempts to have the vehicle 99 learn a new key, many PKES systems 106 use the antenna 102' for communicating with the new fob to be learned. By having the antenna 103 intervene with a null message, such interaction and programming of a new fob is inhibited. It will be appreciated that the null messages sent to the vehicle RFID or NFC device 102' can be a significant improvement providing improved protection since various thieving methods (e.g., reprogramming a new vehicle key using the vehicle RFID or NFC device 102' and a manufacturer code) rely on the vehicle RFID or NFC device 102', such that disabling it effectively prevents thieves from using these methods.

In some embodiments, the interaction detectors 201' (e.g., a radio receiver or transceiver), and optionally the external interaction detectors 201" (e.g., a radio receiver or transceiver positioned outside the main body of the anti-theft device or outside the vehicle's enclosure to better detect/identify the signals from a vehicle's antenna located outside or around its enclosure), can be configured to monitor one or more frequencies or frequency range to detect or identify the various signals which can be generated (e.g., during an intended use) by the vehicle's antennas 102 and/or RFID/

NFC device 102'. It will be appreciated that when the receivers 201' and 201" detect some or any signal (e.g., LF challenges) from the antennas 102 and/or from the vehicle RFID or NFC devices 102', the processor 282 of the device 202 can determine if the signal is associated with an action of the vehicle that relates to the access or controls of the vehicle, which may require the protection (e.g., the double authentication) provided by the anti-theft device or system.

When the vehicle door actuator is pressed, the PKES controller 106 attempts to locate and authenticate the key fob. In some PKES systems this is done by sending challenge messages sequentially using antennae 102 located in different locations in vehicle 99. When device 202 is located in vehicle 99, for example under the dashboard, receiving the challenge messages at receiver 201' may be difficult. One option for detecting these signals is to detect the presence of RF transmission on the wires leaving the PKES controller 106 using a pickup device 201". Alternatively, an antenna 201" may be positioned to be sensitive to the challenge message sent by the PKES over antennae 102. Preferably, the receivers 201' and 201" do not sense transmissions from neighboring vehicles, but only those transmitted by PKES controller 106 of vehicle 99.

In some embodiments, the Bluetooth® transceiver 281' can be used by the processor 282 to communicate/exchange information (e.g., ID, authentication, position, distance, etc.) with a personal ID device (e.g., smartphone running the app 260) of an authorized user. Using the collected authentication information, the processor 282 can determine if the authentication conditions are satisfied, authenticate the person attempting to access the vehicle as being an authorized user, and allow the normal (unimpeded) use of the vehicle 99 by said authorized user.

In some embodiments, e.g., in case the principal personal identifying device runs out of battery, the anti-theft device 202 can be equipped with its own ID reader 289 (e.g., Bluetooth®, LF, NFC, RFID and/or UHF transceiver) that can be used by the processor 282 to authenticate a personal ID device (e.g., secondary personal ID device 265, such as an ID tag, ID fob or Bluetooth® device).

While the various receivers, transmitters and transceivers are presented in FIGS. 3A to 3E as distinct blocks or components of the proposed device or system, it will be appreciated that they can be provided by a single or a plurality of transceivers. In one embodiment, the all the radio signal receiving or transmitting is processed and generated using a single/common transceiver, which can optionally be driven by the driver circuit 287. It will also be understood that a transceiver can also include a transceiver and that the same applies for a receiver.

Figure 4A:
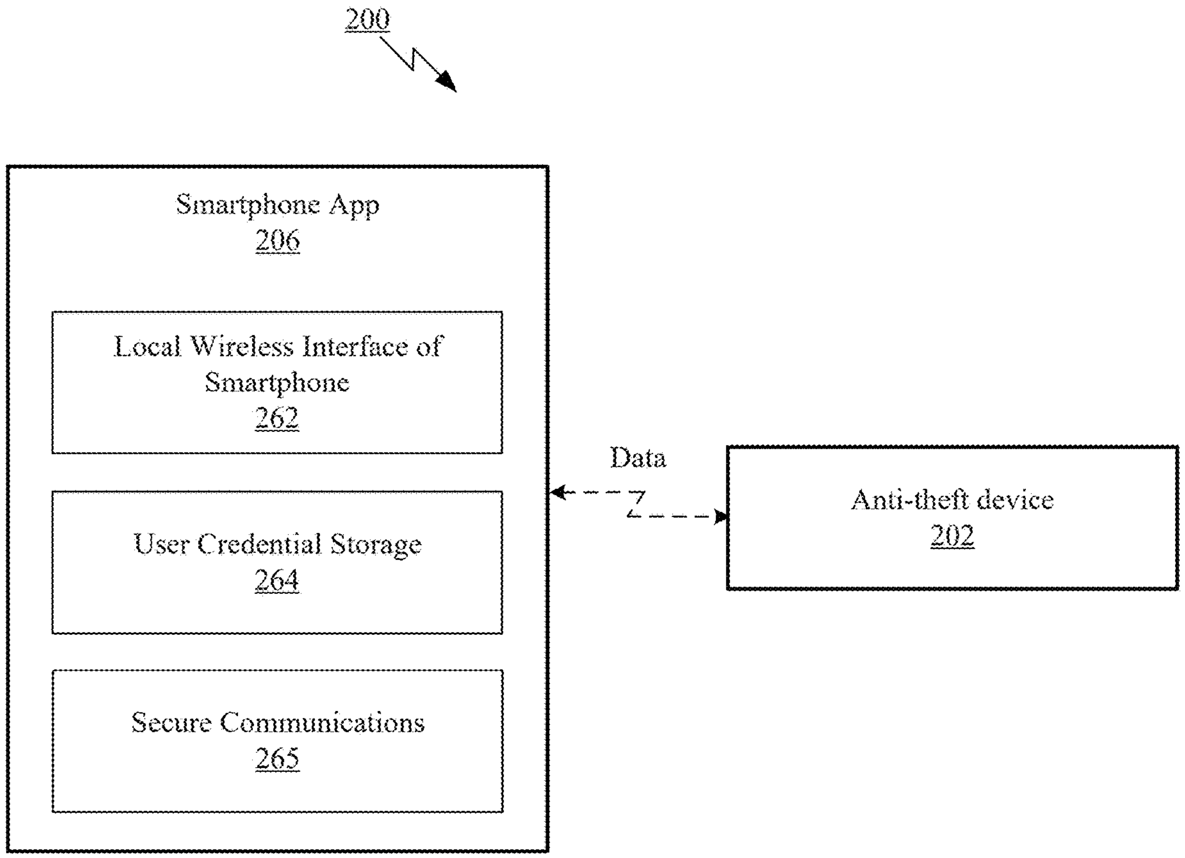
FIGS. 4A and 4B are block diagrams of a system for ensuring that only authorized users can get access or use a vehicle and comprising a smartphone app and an anti-theft device.

Referring to FIG. 4A, a vehicle security system 200' including an anti-theft device 202, a smartphone application (app) 206 for use on a smartphone or personal identifying devices.

As shown, the smartphone app 206 may work with the local wireless interface 262 which is capable of communicating with the device 202. The local wireless interface can be a Bluetooth® interface or another suitable local wireless interface.

The smartphone app 206 may have a user credential storage 264 can comprise various stored authentication credentials that may be used to validate the identity of the personal identifying device of the authorized user.

The smartphone app 206 may have a communication function to send and receive secure communications to and from the communication interface 281 of the anti-theft device 202.

It will be appreciated that the smartphone app may, in some embodiments, be used to request an active authentication input (e.g., entering a security code or providing biometric validation—fingerprint or face recognition—) from the authorized user thereby ensuring that the person approaching with the personal identifying device is indeed the authorized user (i.e., owner of the personal identifying device).

Figure 4B:
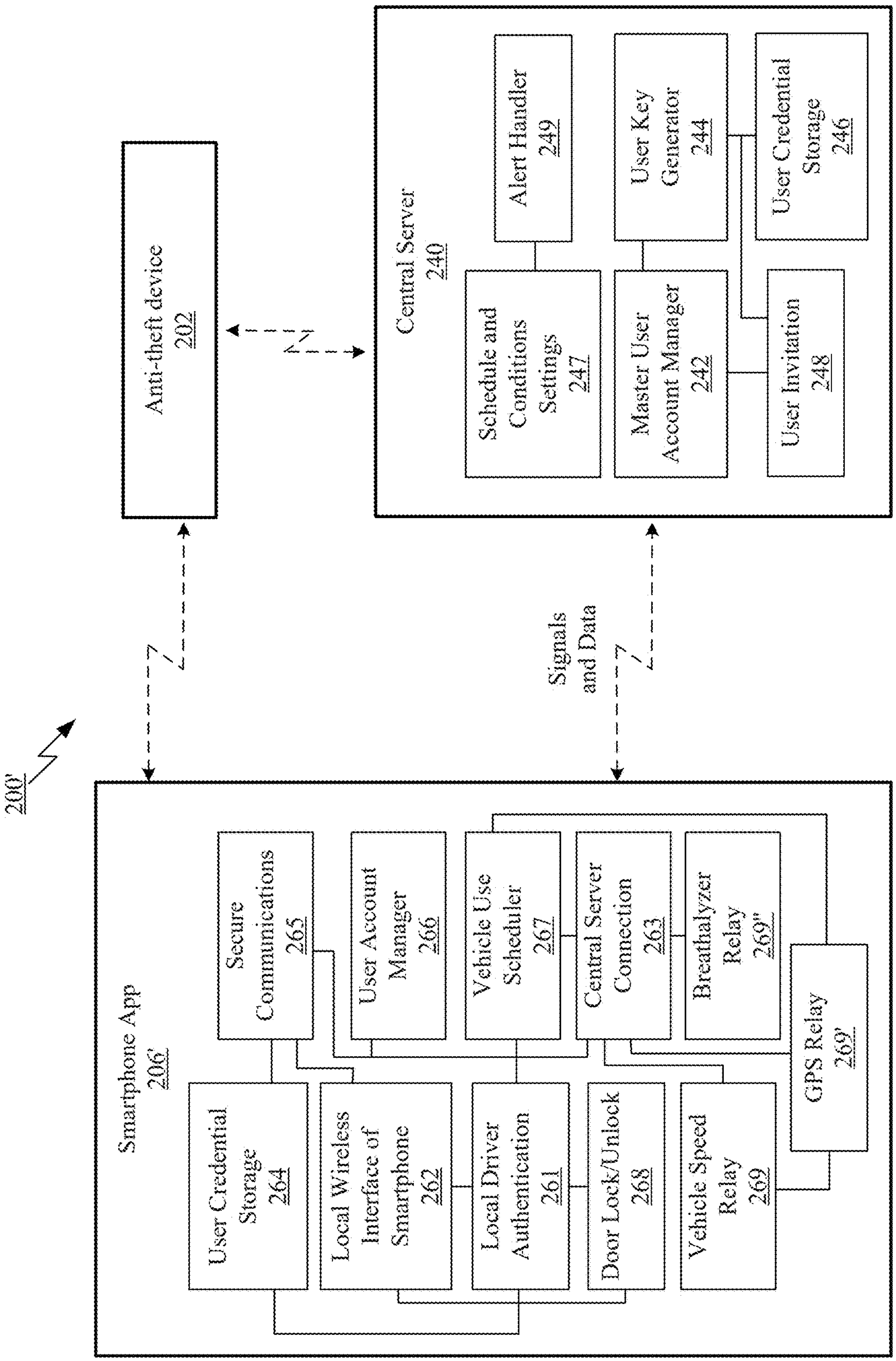

FIG. 4B illustrates an embodiment of a vehicle security system 200' including an anti-theft device 202, an application 206 for use on a smartphone, and a server 204 used in controlling the system. This provides the admin user with the ability to obtain user keys from server 204 and provide multiple smartphones with user credentials to communicate with the anti-theft device 202 to lock, unlock and start the vehicle 99.

In some embodiments, server 204 may have a master user account manager 242 which can be set by the admin user through the use of a user interface (not shown here) or through the user account manager 266. This may be done by providing the information as indicated in the anti-theft device 202 such as serial number or provided upon purchasing the device or by pairing the application 206 with the anti-theft device 202 for the first time.

In some embodiments, the master user account manager module 242 can then provide the other authorized users with access to the vehicle 99 by creating user keys by a user key generator 244. While reference is made to keys, it will be understood that user credentials can comprise data other than encryption keys, such as secure passwords, a list of tokens, etc.

In one embodiment, the keys generated are associated with the anti-theft device 202 as registered by the admin and can be recognized by the anti-theft device 202. They can be stored on a user credential storage 246. The user credential storage unit 246 may store all the credentials received generated by user key generator 244 and use them to reconfirm or retrieve the credentials of the user at a later time. These permissions may be reloaded when master user is in the car with network coverage.

In one embodiment, a predetermined number of user keys or token may be stored in the memory of the anti-theft device 202 by the manufacturer allowing the master user to use them to set up multiple users without requiring connecting to the server 206.

In one embodiment, the user key generator 244 uses the identification information of the anti-theft device 202 to generate the user keys that are acceptable by the anti-theft device 202. In some alternative embodiments, the user key generator simply associates the identifier of the device 202 with the pre-generated user keys stored on user credential storage 246 and provides the admin user with keys stored for that specific anti-theft device 202 upon receiving such a request from the admin.

In some embodiments, a user invitation module 248 may be used to provide the new users having user keys generated for them with invitations to use the vehicle 99. This module may communicate with the mobile app 206 or alternatively directly with a computer device or smartphone of a driver/user and provide them with the invitation to use vehicle 99. This invitation may be in the form of a user key to be used with app 206, if the app is already installed on the phone, or providing a server address to download an app with pre-authorization app to be installed on the smartphone.

In some embodiments, server 204 may have an alert handler 249 which provides an alert for the admin (or other designated users) if the conditions and or schedules as set by a schedule and condition setting 247 are not respected. For example, a schedule for the use of the vehicle 99 can include user reservations or reserved times, and if a vehicle 99 is being used by another user in a manner that puts at risk the vehicle 99 being made available for the user who made the reservation.

As shown, the smartphone app 206 may work with the local wireless interface 262 which is capable of communicating with the device 202. The local wireless interface can be a Bluetooth® interface or other suitable local wireless interface. In some embodiments, a central server module connection 263 communicates over a data network with the server 204 and provides other modules with the user key and other data provided.

In some embodiments, device 202, after initiation or initial pairing (steps of which are explained in detail below), connects to the server 204 through the admin app 206 to get all the user keys generated. The anti-theft device 202 may connect to server 204 via smartphone frequently to update the user keys or other information as required.

In an alternative embodiment, the anti-theft device 202 may have a transceiver that is capable of communicating with the server 204 directly to receive the updated list of the user keys or directly provide the information as requested by the server 204. This may also be used by the admin to remove a driver's access to the vehicle security unit 202 directly through the server without requiring the application 206 to be updated.

In another embodiment, a number of user keys are assigned to an anti-theft device 202 and saved in the device memory (not shown here). Upon initiation of the anti-theft device 202 and/or protocol with the server 204, the server recognizes the authenticity of the anti-theft device 202 using an identifier such as the serial number or MAC address and assigns the user keys allocated for that specific anti-theft device 202 upon request by the admin.

In some embodiments, application 206 only connects to the server 204 once to get the user key which is stored on an end-user credential storage 264. The user credential storage may be a part of the smartphone storage that is used by the app to store the user key.

In some embodiments, vehicle security device 202 may have a predetermined number of user keys pre-assigned to the "master user" and stored within the device in the car and master user smartphone.

In some embodiments, the user key is stored in an encrypted format using the encryption methods known in the art. In one other example, application 206 has to connect to server 204 each time the user wants to use the vehicle 99 to confirm the user key. Furthermore, the application 206 and server 204 may frequently communicate and update any schedules and conditions that may apply to the user key accordingly. These updates may be saved and implemented by a vehicle 99 use scheduler module which works with a user account manager 266.

In some embodiments, a local authentication module 261 may be used, after detection of an interaction with the vehicle 99, authenticate the identity of the user and smartphone by connecting to the anti-theft device 202 to check whether the user is authorized and to determine (e.g., using Bluetooth®) if the user and smartphone is close enough to satisfy the proximity requirements. This allows application 206 to authenticate a smartphone when there is no access to server 204 such as in an underground parking.

The local authentication module 261 may also communicate with the vehicle use scheduler 267 to authenticate the driver and/or apply any particular conditions as required. A door lock/unlock module 268 may work with the local driver authentication 261 directly to allow locking and unlocking of the doors of the vehicles 99 by application 206. Module 268 can comprise program code that gives the user a button or buttons to send door (or trunk) lock and unlock commands via interface 262 to device 202.

In some embodiments, application 206 may further have two relays 269, and 269', as shown in FIG. 4B, to receive the speed, the GPS location of the smartphone, and thus correspond to vehicle 99. While a relay 269" may be used to connect to a Breathalyzer to receive information about the sobriety of the driver. Breathalyzers can connect to a smartphone for measuring blood alcohol levels from breath and are known in the art. This information may be required by app 206 to authenticate and provide the driver with access to vehicle 99 so that sobriety of the driver in ensured.

In some examples, it may be a required condition, as implemented by the vehicle use scheduler 267, to have the driver uses a Breathalyzer before the driver is authorized to use the vehicle 99. Similar conditions or limitations can be implemented such as limiting the speed of the vehicle 99 or limiting the geographical limits for use of the vehicle 99 using the relay inputs.

In some embodiments, the application 206 has a different version for a non-admin driver which does not include the user account manager 266 and vehicle use scheduler 267.

Despite the schematic illustration in FIG. 4B, it would be appreciated by those skilled in the art that the modules as described herein may computer-readable instructions stored on the memory of the smartphone which, when executed by the smartphone processor, perform the different task and features in relation to different modules of the app 206 as described herein.

It will be appreciated by those skilled in the art that it is not necessary for application 206 to work on a smartphone and any type of computing devices may be used to implement the details of the application as disclosed herein. In some embodiments, a user device or personal identifying device can be implemented as a fob-like device.

In some embodiments, a separate wireless capable remote key capable of working with the vehicle security system 200' may be used instead of the application 204 which may have all or partial features of the app 206.

The use of user keys can comprise the use of single-use tokens or codes so that vehicle 99 can be used in the absence of a data connection to the server 204, for example when the vehicle 99 is in an underground parking garage. In these embodiments, device 202 is configured to allow driver authentication by using such codes, and to allow the vehicle 99 to be driven without requiring connection to server 204. When a connection to server 204 is restored, device 202 may then impose any driving conditions that were established with previous server communication. Alternatively, device 202 can be operated in a stand-alone mode that does not involve a server 204. In such embodiments, device 206 is used by a master user to configure users and the conditions and credentials for users are all stored in the device 202.

It will be appreciated that in some embodiments some up to all of the previously described functions that the central server personal identifying device of an authorized user 240 can perform can be done by or programmed in the anti-theft device 202, thereby potentially, and preferably, making it totally autonomous.

As shown in FIG. 3E, there may be provided an installer interface device 250 for the anti-theft device 202. The installer interface 250 can be used to select, for example, a make and model of the vehicle 99. Memory 283 of the anti-theft device 202 may store parameters in association with a wide range of known vehicles, or the parameters for the known vehicles may be stored in interface 250, for example when it is an app on a smartphone. The installer's selection at interface 250 may in turn be used to retrieve parameters specific to the PKES controller of the vehicle 99, for example the specifics of the wireless communications, such as frequency, packet or response format (e.g., the message header format, payload length, any checksum fields), etc. Additionally, the installer may use interface 250 store in memory 283 a vehicle ID and/or a fob ID if the PKES controller 106 of vehicle 99 requires such data in an acceptable response message. Such identifiers may require retrieval by the installer from the PKES controller 106 at the time of installation of the anti-theft device 202. If the user's vehicle 99 is not found in memory 283, then the installer may configure the anti-theft device 202 with settings for the unknown vehicle as required. This would require the installer to research details about vehicle 99.

The installer interface device 250 may also be operative to cause device 202 to record a response message generated by a key fob 104. The interface would command device 202 to enter into such a recording mode and would then prompt the user to cause the vehicle to send a challenge message to the key fob 104. Receiver 201' in this case would receive the challenge message and either transmitter 281" would be adapted to receive the key fob's response or another receiver would be used to receive the fob response transmission and to record it. The recorded response can then be used in the formulation of the null message. In this way, the device 202 can obtain the format of the fob response.

Installer interface device 250 may also be operative to cause device 202 to detect the transmission from a given "extra" key fob 104 that is to be excluded from control by anti-theft device 202. By having only one fob 104 present, namely the extra key fob 104, interface device 250 would command device 202 to enter into a time slot detecting mode and would then prompt the user to cause vehicle 99 to send a challenge message to the key fob 104. Receiver 201' in this case would receive the challenge message and either transmitter 281" would be adapted to receive the key fob's response or another receiver would be used to receive the fob response transmission and to detect the time slot in which the response was sent. If two responses from two different fobs are detected, device 202 could then report an error to interface 250 to have the installer ensure that there is only one fob 104 present. Device 202 can then record in its settings that the null message is not to be transmitted in the time slot assigned to the given key fob 104. In this way, device 202 can allow the given key fob to provide a valid response to the PKES without requiring authentication by device 202.

Installer interface 250 can connect to device 202 by transceiver 281' or using a serial data port of processor 282. Installer interface 250 may be provided on a computer or a smartphone app. Installer interface 250 may be used to provide the initial master authentication to the user. This may be done by generating or providing a code for the user for the user's smartphone app. This may also be done by making device 202 learn to trust a given user device 260 or user ID tag 265. When the installer interface is connected to the Internet, it may communicate with a server that will handle a transfer of credentials to the user device 260.

What is claimed is:

1. A theft-prevention device for a vehicle having a passive keyless entry and start (PKES) system for authenticating a driver possessing a key fob to use the vehicle, the device comprising:
- an intended use detector having an output indicative of an intended use of said vehicle, said detector comprising one or more of the groups consisting of:
  - I. a wireless receiver for detecting a low-frequency (LF) radio signal challenge message sent by the PKES system to the key fob indicating intended use of the vehicle;
  - II. a proximity sensor for detecting a presence of a person next to or inside the vehicle; and
  - III. a camera for detecting the presence of the person next to or inside the vehicle;
- an authenticator for attempting authentication of a personal identifying device of an authorized vehicle user in proximity to said vehicle or inside the vehicle by exchanging authentication information with said personal identifying device;
- a Radio Frequency Identification (RFID) transmitter for transmitting a disrupting RF signal to disrupt an RFID transceiver of the vehicle to inhibit programming or reprogramming of the key fob or to disrupt RFID communication with the key fob, wherein the RFID transmitter is responsive to said intended use detector output and to said authenticator; and
- a vehicle start disabler responsive to said intended use detector output and to said authenticator, the vehicle start disabler comprising one or more of the group consisting of:
  - a) a disrupting transmitter for sending a UHF signal to disrupt unauthorized transmission from the key fob to the PKES system;
  - b) at least one switch for controllably disconnecting one or more antennae from the PKES system for interrupting transmission between the PKES system and the key fob;
  - c) a wireless transmitter for sending a wireless key fob "lock and arm" command to the PKES system;
  - d) a switch for controllably interrupting detection of a start button and/or a brake pedal; and
  - e) a bus message transmitter for sending messages on a bus of the vehicle to impair use of said bus,
- whereby the vehicle is prevented from being started when the personal identifying device is not proximate to the vehicle.

2. The theft-prevention device as defined in claim 1, wherein said authenticator comprises a Bluetooth® transceiver to communicate with the personal identifying device.

3. The theft-prevention device as defined in claim 1, wherein said vehicle start disabler is said disrupting transmitter, wherein said disrupting transmitter is configured to send a first disabling command using said UHF signal and a second disabling command to the RFID transmitter to send the disrupting RF signal to disrupt the RFID communication between the key fob and the RFID transceiver of the vehicle.

4. The theft-prevention device of claim 1, wherein said vehicle start disabler is said disrupting transmitter for sending a UHF signal to disrupt unauthorized transmission from the key fob to the PKES system.

5. The theft-prevention device of claim 1, wherein said intended use detector is the wireless receiver for detecting the radio signal challenge message sent by the PKES system.

6. The theft-prevention device of claim 1, wherein the RFID transmitter is an RFID transceiver of the theft-prevention device for detecting activation or use of the RFID transceiver of the vehicle, and for sending the disabling RF signal in response to the detection of the activation of the use of the RFID transceiver of the vehicle.

7. The theft-prevention device of claim 1, wherein the disabling RF signal of the RFID transmitter comprises a null message that will be rejected by the PKES system and will cause the PKES system to reject following RF messages received by the RFID transceiver of the vehicle.

8. The theft-prevention device of claim 6, wherein the disabling RF signal of the RFID transmitter comprises a null message that will be rejected by the PKES system and will cause the PKES system to reject following RF messages sent by the key fob.

9. The theft-prevention device of claim 1, wherein the RFID transmitter is a Near-Field Communication (NFC) transmitter for sending a near-field signal to disrupt the RFID transceiver of the vehicle.

10. The theft-prevention device of claim 1, wherein the RFID transceiver of the vehicle is an NFC transceiver of the vehicle, wherein the RF signal of the RFID transmitter is an NFC signal to disrupt the NFC transceiver of the vehicle, and wherein the RFID transmitter is an NFC transceiver that, when positioned near the NFC transceiver of the vehicle, is for detecting activation or use of the NFC transceiver of the vehicle and for sending the NFC signal in response to the detection of the activation of the use of the NFC transceiver of the vehicle.

11. The theft-prevention device of claim 1, wherein the RFID transmitter is an LF antenna using frequency between about 125 kHz and about 132 KHz.

12. The theft-prevention device of claim 6, wherein the RFID transceiver is an LF antenna using frequency between about 125 KHz and about 132 KHz.

13. The theft-prevention device of claim 9, wherein the NFC transmitter operates at about 13.56 MHz.

14. The theft-prevention device of claim 1, wherein said intended use detector is the wireless receiver for detecting the radio signal challenge message sent by the PKES system;

wherein the vehicle start disabler is the disrupting transmitter responsive to said intended use detector output and to said authenticator for transmitting to the PKES system the UHF signal comprising a null message based on a timing established by the detection of said radio signal challenge message by the intended use detector; and wherein, when the personal identifying device is authenticated and is proximate to the vehicle or inside the vehicle, the disrupting RF signal is not sent by the RFID transmitter and the UHF signal is not transmitted by the disrupting transmitter.

15. The theft-prevention device of claim 1, further comprising a UHF transmitter for sending a UHF signal to disrupt unauthorized transmission from the key fob to the PKES system, and wherein the vehicle start disabler comprises a controller responsive to:

said intended use detector and said authenticator for activating said RFID transmitter, and said UHF transmitter for preventing successful communication between the key fob and the PKES system in absence of the authorized vehicle user.

16. The theft-prevention device of claim 1, wherein said vehicle start disabler is the at least one switch for controllably disconnecting the one or more antennae from the PKES system for interrupting said transmission between the PKES system and the key fob.

17. The theft-prevention device of claim 1, wherein said vehicle start disabler is the wireless transmitter for sending the wireless key fob "lock and arm" command to the PKES system.

18. The theft-prevention device of claim 1, wherein said vehicle start disabler is the switch for controllably interrupting the detection of the start button or the brake pedal.

19. The theft-prevention device of claim 1, wherein said vehicle start disabler is the bus message transmitter for sending the messages on the bus to impair use of said bus.

20. The theft-prevention device of claim 1, wherein said intended use detector is the proximity sensor for detecting the presence of a person next to or inside the vehicle or is the camera for detecting the presence of the person next to or inside the vehicle.

* * * * *